(12) United States Patent
Carmel et al.

(10) Patent No.: US 7,689,431 B1
(45) Date of Patent: Mar. 30, 2010

(54) CONTEXT SPECIFIC ANALYSIS

(75) Inventors: Erez Carmel, Folsom, CA (US);
Barbara B. Nixon, De Pere, WI (US)

(73) Assignee: Winway Corporation, Folsom, CA (US)

( * ) Notice: Subject to any disclaimer, the term of this patent is extended or adjusted under 35 U.S.C. 154(b) by 1655 days.

(21) Appl. No.: 10/370,931

(22) Filed: Feb. 20, 2003

Related U.S. Application Data

(60) Provisional application No. 60/373,864, filed on Apr. 17, 2002.

(51) Int. Cl.
*G06Q 99/00* (2006.01)
(52) U.S. Cl. .......................................... 705/1
(58) Field of Classification Search .................. 705/1
See application file for complete search history.

(56) References Cited

U.S. PATENT DOCUMENTS

| | | | | |
|---|---|---|---|---|
| 6,085,206 A | * | 7/2000 | Domini et al. | 715/257 |
| 6,874,002 B1 | * | 3/2005 | Peleus et al. | 707/204 |
| 6,938,206 B2 | * | 8/2005 | Ingle et al. | 715/254 |
| 2001/0034630 A1 | * | 10/2001 | Mayer et al. | 705/7 |
| 2007/0198319 A1 | * | 8/2007 | Sciuk | 705/8 |

\* cited by examiner

*Primary Examiner*—Jonathan Ouellette
(74) *Attorney, Agent, or Firm*—Vierra Magen Marcus & DeNiro LLP

(57) ABSTRACT

An automatic critique of resumes, cover-letters, and/or other types of documents is provided. The invention employs an input document, a processing device, and a set of rules specific to the document type. The processing device searches the document for specific patterns described by the rules, generates a list of potential errors in the document, generates advice on how to correct the errors and may produce various figures of merit for the document.

27 Claims, 17 Drawing Sheets

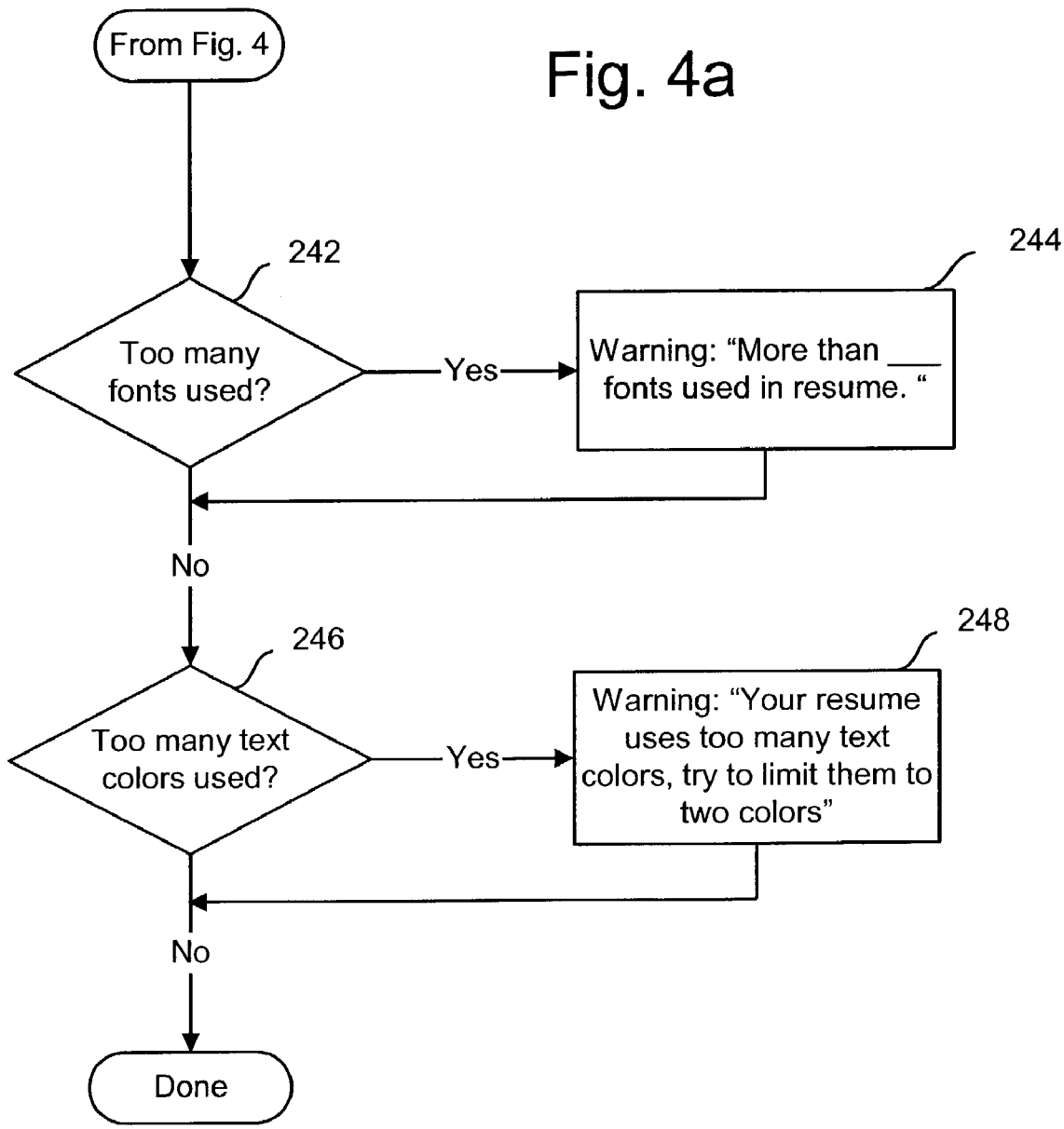

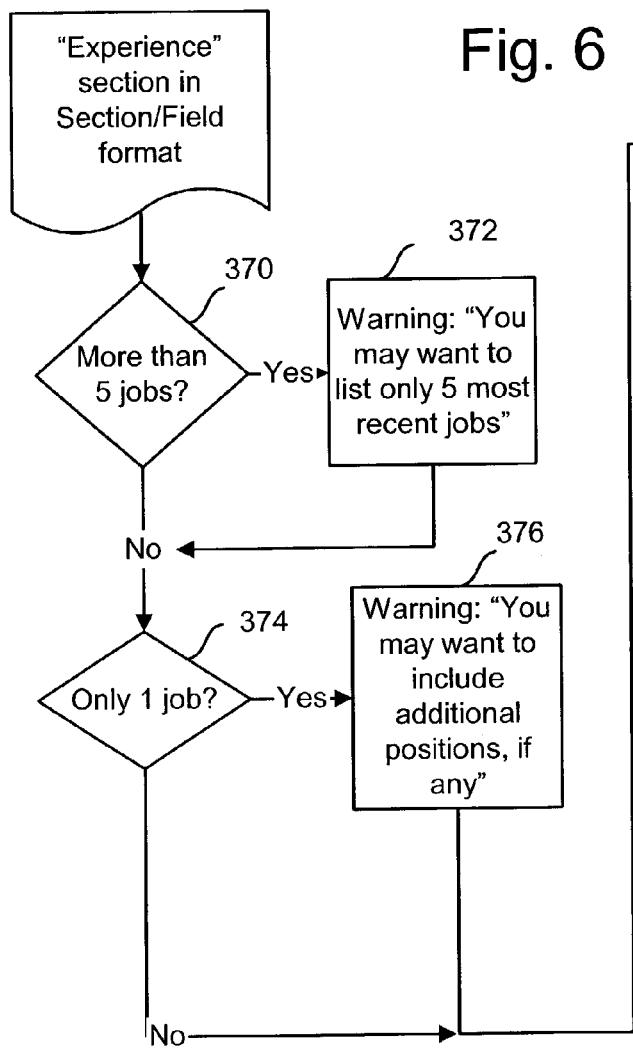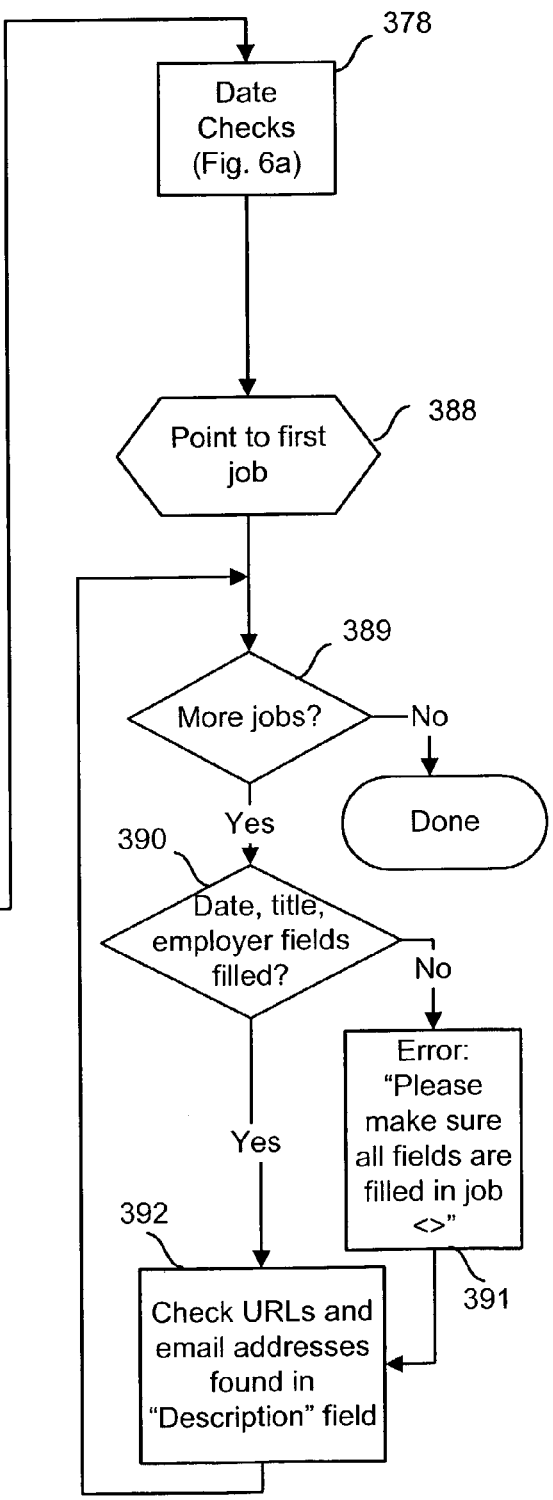
Fig. 6

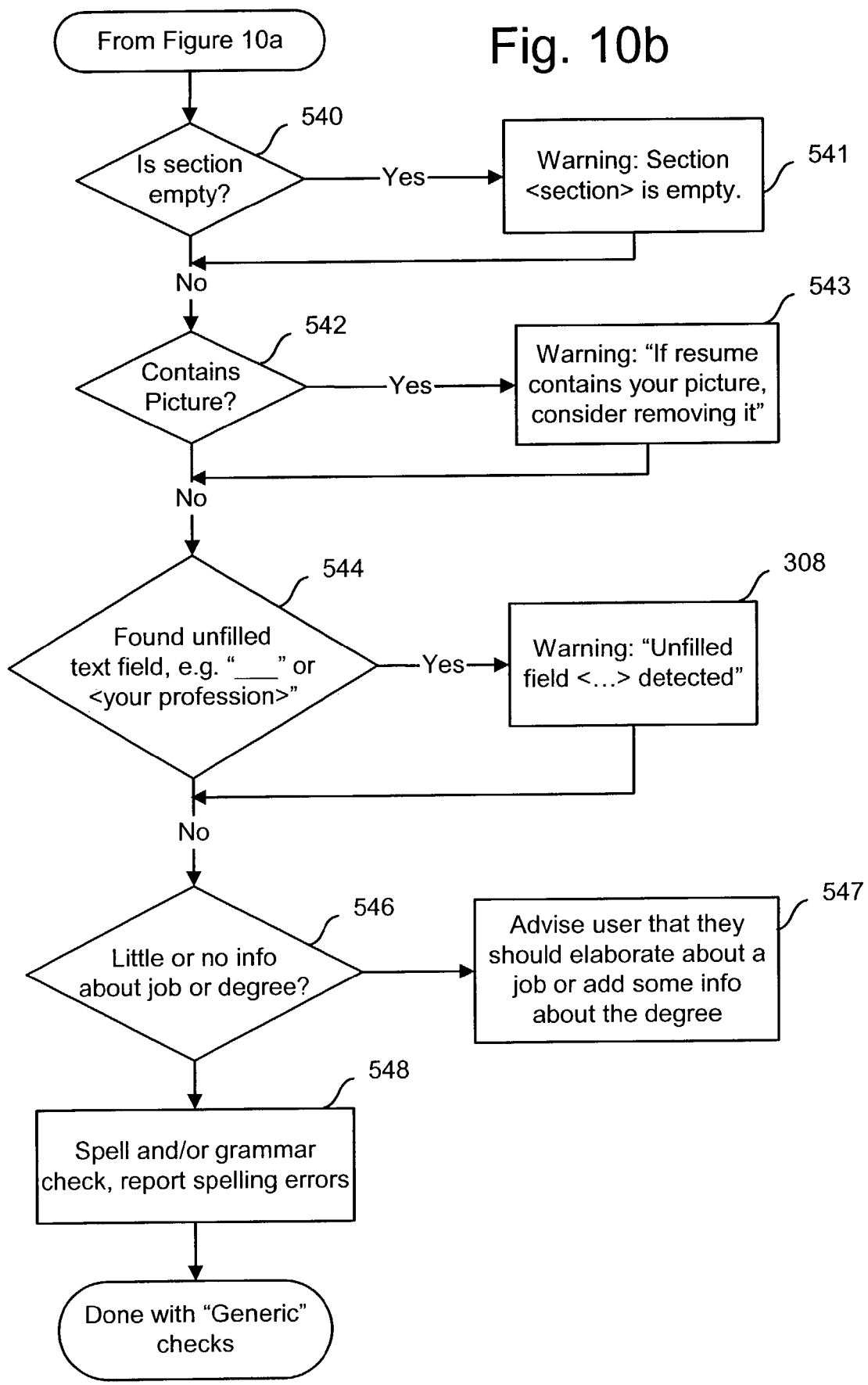

ously filed patent application and are incorporated herein by reference:

CONTEXT SPECIFIC ANALYSIS

This application claims the benefit of U.S. Provisional Application No. 60/373,864, "Method And Apparatus For Automatic Critique Of Resumes And Letters," filed on Apr. 17, 2002, which is incorporated herein by reference.

BACKGROUND OF THE INVENTION

1. Field of the Invention

The invention pertains generally to processing of text documents, and in particular to methods of evaluating documents using criteria that is specific to the type of document being evaluated.

2. Description of the Related Art

The task of creating a resume that follows the conventions expected in the industry, while being technically correct, and including appropriate action words, and the like, is a time consuming and error prone process. Typically, the job seeker is not savvy as to the metrics used by the prospective employer in evaluating the formal aspects and general content of the resume. It will be appreciated that due to the large volume of resumes received, a number of companies will sort these resumes according to a number of subjective criteria, which are often not strictly related to the position being filled. The sorting of the resumes in this manner speeds the process of finding candidates that appear most suitable and serious about the position, and reduces the overhead inherent in the hiring process. Often resumes are first filtered by the human resources department, or other personnel, wherein only resumes ranking highly in the sorting process are viewed in more detail by human resources personnel or by the manager seeking to fill a particular position for which the resume has been sent. Job seekers would benefit from having their resumes checked and improved prior to submission.

Spelling and Grammar Checks

A number of tools exist for checking written documents, but these are generally provided to check generic document characteristics such as spelling and grammar, and allow for correction.

Spelling and grammar checking routines are incorporated in many word-processing programs to aid the user in generating a grammatically correct document. These tools are designed to check documents written in a specific language, but usually make no consideration for the specific type of document. Hence, they would apply the same set of rules to resumes, to cover letters, and to chocolate cake recipes. When applying spell-check or grammar-check to a resume, one would expect the detection of language errors, but will not expect to detect violations of even the most basic rules of effective resume and cover-letter writing.

Document-Specific Checks—Microsoft Power Point

One software tool that offers checks beyond grammar and spelling is Power Point, published by Microsoft from Redmond, Wash. The program takes advantage of the specific nature of the document—slide presentations—and applies several document-specific checks. One of the automatic checks verifies that slide titles use a user-selectable case (UPPER case, lower case, or Sentence case). Another check verifies that the body text of the presentation uses a user-selectable case (UPPER case, lower case, or Sentence case). Another check verifies that end-punctuation of paragraphs uses a user-selectable character such as a period. Another check requires that the total number of fonts used in the presentation does not exceed a user-specified number, such as 3. Another check verifies that text size of the slide title is larger or equal to a user-specified number of points such as 36. Another check verifies that the text size of the body text is larger or equal to a user-specified number of points such as 20. Another check verifies that the number of bullet points per slide does not exceed a user-specified number such as 6. Another check verifies that the number of lines per bullet point does not exceed a user-specified number such as 2.

Document Specific Checks—Performance Appraisal Writers

A program called Avantos Review Writer, published by Avantos Performance Systems of Emeryville, Calif. in 1994, was designed to assist managers in writing performance appraisals for their employees. The program provides various tools for writing the performance appraisal as well as checking it for conformance to a set of rules. These checks include "Legal Check," "Originality Check," and "Completeness Check." The "Legal Check" will flag, for example, the word "baby" as a potential reference to either age or behavior, which may not be appropriate in a performance appraisal document. The "Originality Check" will flag any case where the example text provided by the program was left unchanged in the final performance appraisal document. The "Completeness Check" looks for fields that were left blank and should have been filled to create a valid performance appraisal. Another performance appraisal tool, Performance Now, published by Knowledge Point of Petaluma, Calif. in 1994, also offered tools for writing performance appraisals and checking them for language that may reflect employment discrimination.

Resume Creation Tools

Several tools exist which are directed at the creation of winning resumes and cover letters, such as WinWay® Resume Deluxe, published by WinWay Corporation of Folsom Calif. Resume creation is a constantly evolving field, which seeks to maximize the efficiency with which resumes are created and the effectiveness of the completed resumes.

Specific Checks

One important area in resume creation involves the checking of the job history section, for example, verification of employment dates. One resume-writing program, "PFS:Resume and Job Search Pro" by The Learning Company of Cambridge, Mass., includes a "Verify Dates" feature. Provided that the user has entered their employment dates into the required fields, the "Verify Dates" feature checks "employment dates" conformance against a set of rules. For example, the "employment dates" field must conform to a standard date format such as "March 2000 to June 2001", "March 2000", "1990 to present." The program checks for format consistency of dates. Many dates formats are allowed, such as "1998", "march 1998" and "Jan. 31, 1998." The program checks that all dates within the same resume section use the same format. A string such as "very long ago" in the "employment date" field would be flagged as an error, with an acceptable year range including 1900-2100. A year such as "1790" could be considered as an error. The program also requires all dates to conform to the "reverse chronological order" rule, that is, the most recent job should be listed first. Any significant time gaps between jobs listed in the chronological section of the resume are flagged as errors. Date-range overlaps are flagged as a violation of the "reverse chronological order" rule. Upon detection of possible errors, this program reports the error to the user and may suggest a correction. While date checking is indeed a useful feature, this particular resume-writing program falls short in recognizing and reporting specific date cases. For example, if a resume contains two jobs with overlapping time periods, the program will report this as a violation of the "reverse chronological order" rule instead of pointing out that there is a date overlap, which could be a benign situation. Also, the program does not check the time-sequence ordering of schools listed in the education section. Further, and most importantly, this program falls short of protecting the user from many other potential pitfalls specific to the field of resume and letter writing, and cannot check resumes files unless those files contain the employment dates in certain designated fields.

Limitations of Existing Art

Application completeness is often a problem area in resume and letter creation and applicants may leave out important fields such as their full name, street address, phone number, alternate/cell-phone number, or e-mail address. When describing their work experience, applicants may forget to include employment dates, employment location, or job title. Applicants may describe a job just by job title and employment dates, without adding some helpful information about their specific tasks and accomplishments. When describing their education, applicants may neglect to include important information such as name of the school, degree obtained, or graduation date. Applicants may even omit whole sections of the resume such as Experience or Education. Such omissions could result in their resume being discarded.

Additionally, even if a required data item is entered, problems can arise with the applicant entering the wrong information, or inappropriate information within a given field. For example, an applicant who is using a template for writing their resume may leave template fields such as "<put your job title here>" or "<put number of experience years here>" intact. Also, an applicant could enter information about their age, religion, gender, sexual preference, where any of these items would be very troubling to a human resource professional who is trying to avoid potential discrimination complaints. When entering a web page address, applicant may accidentally enter an incorrect web address—one that leads nowhere, or even worse—one that leads to a page containing information that may reduce, rather than enhance their employment prospects. Likewise, applicants may enter an email address that is incorrect, thus making it very likely that any employer response will go unnoticed. Applicants may also make the common mistake of providing a phone number, street address or email address of a current employer; something their current or prospective employer may consider inappropriate. Even if the phone number is personal, the applicant may provide a phone number that is not monitored at all hours of the day, and neglect to make sure there is an answering machine connected to that number.

When describing their work experience, applicants may overlook problems with the dates associated with each job. Common problems include date overlap between two jobs, date gaps, where it appears that the applicant was unemployed for any period of time, or wrong ordering of the jobs, where the jobs are not ordered in reverse-chronological-order as is customary in resumes. Such date errors may cause a potential employer to discard an otherwise-acceptable resume and thus will reduce the chances of employment.

Furthermore, applicants may incorrectly or less effectively order the elements within the resume, or cover letter, and reduce their chances of being considered for a position. For example, an applicant who has just completed his/her PhD degree and whose entire employment history consists of temporary jobs at fast-food restaurants may inappropriately list these temporary jobs before describing the recently acquired and highly sought-after PhD degree. Less common but still possible errors include positioning of the Objective section anywhere but at the top of the resume, or positioning the References section anywhere but at the end of the resume.

When describing their Education, applicants may include information that is detrimental to their employment prospects, such as a GPA (Grade Point Average) that is lower than 3.0. Such GPA would better be left out of the resume. Also, applicants may overlook the opportunity to add value to their resume by describing various jobs they held in order to finance their tuition, or extra-curricular activities that add value to their degree or contribute to the community.

Within the References section, applicants may include names of references without properly preparing those references or even telling them that they are mentioned. Such practice may cause a person named as reference to provide inappropriate or even damaging information.

Applicants may also make formatting errors in their resume. For example, they may use page margins that are too small, too large, or unbalanced. They may also create a multi-page resume where the last page is almost empty, leaving the reader feeling that something is missing or the resume is out of balance. Applicants may create resumes that contain too many pages, where a shorter, more focused resume may produce better impression. Applicants may use fonts that are too large or too small for comfortable reading, or text colors that are too light to be reproduced well or difficult to scan by a computer scanner. They may use too many types of typefaces or too many text colors, distracting the reader from actual resume content. They may insert unusual characters such as "~" or "\" by mistake, when they in fact intended to insert a valid character or a bullet. They may capitalize large sections of the resume to emphasize them, not realizing that readability is greatly impaired by this practice. The may use a non-standard typeface that only exists on their own system, but is not present on other systems. Hence certain characters that appear readable on the original system (e.g. a special type of bullet) may look completely different on another system. One particular case that comes to mind involves a resume that originally included a bullet character next to each phrase. However when our company received the resume via e-mail, it appeared to contain a question mark next to each accomplishment. Obviously this did not reflect well on the applicant.

A number of formatting, structure, and syntax faux pas can still occur on resumes that likewise limit the effectiveness of the resume and may thereby constrain probability of being seriously considered for a position. One area that is often missed is relating to the consistency conventions, whereas for example a particular structure may be correct when considered individually, but is inconsistent with other aspects of the resume, or cover letter (for example, inconsistency in capitalization, indentation, font size, color, end-punctuation of bullet items, etc.)

Applicants may use various stock phrases such as "Duties included" or "Responsible for" in their resume where a more proactive description of their roles would be much more attractive to a prospective employer. Applicants may also use words such as "I" or "me" in a resume where such wording is usually inappropriate. Other items that are best left out of the resume or cover letter include any discussion of salary, reason for leaving, physical attributes such as height, weight, date of birth, social security number, age, gender, marital status, spouse or children, religion, ethnic background and political affiliation.

Applicants may include photographs in their resume, something that is not recommended for any but few specific occupations such as modeling.

Most of the above issues apply equally to cover letters as well as to resumes. When creating a cover letter, applicants may forget to include a complete address for the employer they are targeting, or forget to include "Enclosure" line at the end indicating that a resume is enclosed.

When creating a resume, cover-letter, or similar employment-related document, the applicant wants to create the highest quality, most effective document based on their given qualifications. Unfortunately, to enhance effectiveness they are often left creating a number of tries and then visually attempting to determine how effective it might be.

It will be appreciated that resume programs address a need that goes beyond conventional word processing software, however, that current resume programs have significant limitations that may reduce the effectiveness of the final result.

Therefore, a need exists for an automated process to check resumes and cover letters for common errors that are not caught by generic spell-check and grammar-check processes. Such a tool will help users create enhanced resumes and cover-letters. The present invention satisfies those needs, as well as others, and overcomes the deficiencies of previously developed document processing systems and applications.

SUMMARY OF THE INVENTION

The present invention, roughly described, generally pertains to processing of text documents. One embodiment is directed to methods of evaluating resumes and cover letters being created by job applicants to identify elements of the resume and letter which should be modified in order to obtain a favorable review by prospective employers. Resumes, cover letters and other similar documents created specifically to be submitted as part of a job seeking process are referred to as job seeking documents.

One embodiment of the present invention is directed at helping job applicants verify that their resumes and cover letters are effective, technically correct, appropriately structured, grammatically correct, and appropriately formal. The invention reduces the efforts and guesswork involved in the processing of preparing a resume that will be well received by employers. It has been realized that candidates are often screened by an evaluation of their resumes in relation to certain document characteristics. A resume document is critiqued by the system according to a number of criteria or rules with appropriate feedback provided as to correcting aspects of the resume, which may reduce its effectiveness and thereby limit its chances for subsequent review.

The invention extends current spell checking and grammar-checking tools toward the goal of properly checking and providing correction feedback for the preparation of resumes and cover letters against a set of rules specifically formulated for these types of job seeking documents. Feedback is provided to the user and the system makes specific recommendations about how to improve the effectiveness of the resume and/or cover letter.

The present system is preferably implemented as an application program for a general-purpose computer system, such as a personal computer or web server. The present invention may be provided as a standalone software application program on a computer system, a feature within an existing application program (e.g. a word processor or a resume writing program), and so forth. The present invention may also be implemented on web server (Internet, Extranet, Intranet, etc.), or similar, which hosts a web site that allows applicants to check their resumes for errors, and optionally submit them online. Use of the web site by the prospective applicant may be subject to charges or provided to encourage the use of associated services or patronage of select web vendors.

The present invention can be accomplished using hardware, software, or a combination of both hardware and software. When implemented with software, the software used for the present invention is stored on one or more processor readable storage devices including hard disk drives, CD-ROMs, DVDs, optical disks, floppy disks, tape drives, RAM, ROM or other suitable storage devices. The software can program one or more processors in communication with storage devices, peripherals (e.g. keyboard, pointing device, monitor, printer, etc.), and communication interfaces (e.g. network card, modem, wireless device, etc.). For example, the present invention can includes software that programs a personal computer, workstation, server, mainframe, portable computing device, etc. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIGS. 4 and 4a depict a flow chart of one embodiment of a process for global document checks.

FIG. 6 is a flow chart of one embodiment of a process for experience section checks.

FIGS. 10, 10a and 10b depict a flow chart of one embodiment of a process for generic section checks.

DETAILED DESCRIPTION

It will be appreciated that the disclosed system may vary as to configuration and as to details of the parts, and that the method may vary as to the specific steps and sequence, without departing from the basic concepts as disclosed herein.

Figure 1:
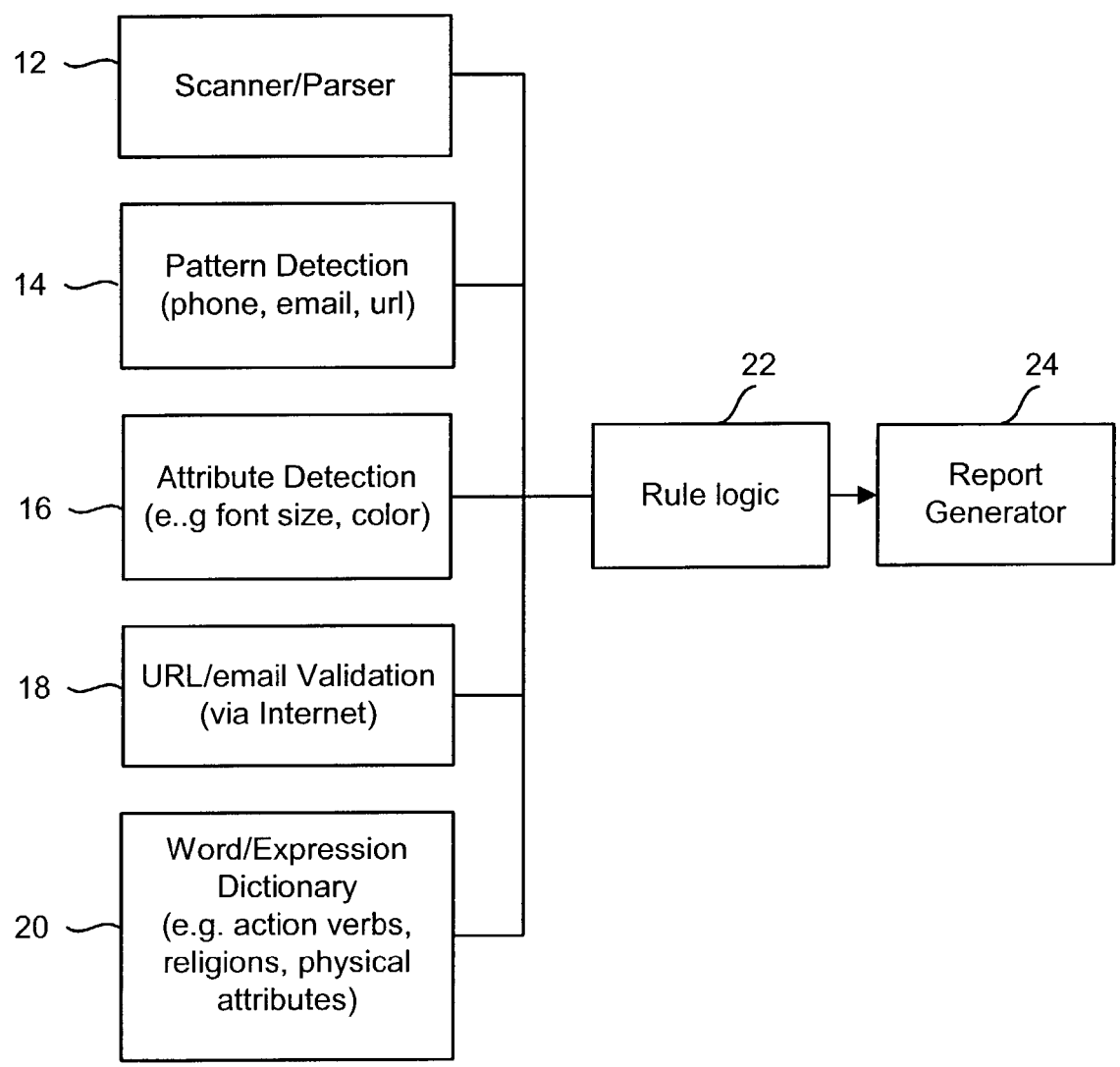
FIG. 1 is a block diagram of one embodiment of a system for implementing the present invention.

One example of an implementation of the present invention is depicted in FIG. 1, and represents a system by way of example that includes the following modules:

SCANNER/PARSER 12—the function of this block is to scan the input document and provide its component parts to the other modules of the program in a sequential manner using an internal representation of the document content.

PATTERN DETECTION 14—the function of this block is to search for known patterns such as e-mail pattern (x@y.z), URL pattern (http://x/y.com), resume heading pattern (Experience:, Education:), etc.

ATTRIBUTE DETECTION 16—the function of this block is to process font, paragraph and page attributes such as font size, font color, paragraph indentation and tabulation, page margins, etc.

URL/EMAIL VALIDATION 18—the function of this block is to try and connect to a specific web address or email address via the Internet in order to find out whether the address is valid WORD/EXPRESSION DICTIONARY 20—this module contains various lists of words and phrases that are used by other parts of the program. This module is language-specific and multiple lists may be used to facilitate checking of documents in multiple languages.

RULE LOGIC 22—this module contains tables as well as custom code modules that look for specific errors in the input document.

REPORT GENERATOR 24—this module formats and presents the errors and warnings to the user. This may be done as a list of errors, a visual representation of the tests that passed vs. those which failed, or similar representation that conveys to the user the results of the check and optionally overall metrics representing the merit of their document.

The components of FIG. 1 will be operating on one or more computing devices, including servers, personal computers, main frames, mobile computing devices, handheld computing devices, telephones, etc.

Input Format—Field/Section

Form based applications such as WinWay Resume Deluxe published by WinWay Corporation of Folsom, Calif., present the user with a series of forms for entering their resume. This type of resume entry forms is often used on web sites as well. Such resume entry-forms prompt the user for specific resume or letter FIELDS, which are grouped into SECTIONS. A field is a structure for holding/storing/marking one or more data values. Typical resume sections include "Name", "Objective", "Experience", "Education", and "References." Other sections can also be used. Each resume section is further comprised of Fields. For example, the "Name" section of the resume is typically comprised of fields such as "Applicant's name", "Street Address", "City", "State", "Zip", "Country", "email address", "web address", etc. For each job listed, the "Experience" section of the resume contains fields such as "Employer name", "Job Title", "Employment start date", "Employment end date", "Employer location", "Description", etc. For each school attended, the "Education" section of the resume contains fields such as "School name", "School location", "Degree obtained", "Graduation year", "GPA", "Description" etc. Other sections of the resume such as "Objective" or "References" include a single field for the description associated with that particular section. Similarly, a form-based program may offer the option to create cover letters, which may also be divided into sections such as "From name/address", "To name/address", "Letter body", "Signature", etc. The letter's "From name/address" and "To Name/address" sections contain fields such as "Name", "Street Address", "City", "State", "ZIP", "Country", etc.

This field/section structure makes it easy to analyze the text because each item of text is presented within a well-known context, giving the text analysis logic a head start.

Alternate Input Format—Plain Text

While the Field/Section format is more desirable for comprehensive analysis, resumes and letters can also be presented in a plain text format. These documents may have been prepared with a conventional word processor, or they may have been created by a form-based application but then compiled into an output format that no longer has filed/section delineation. One embodiment of the present invention converts such plain text documents into field/section format by looking for specific boundaries in the document.

Top Level Flow Chart

Figure 2:
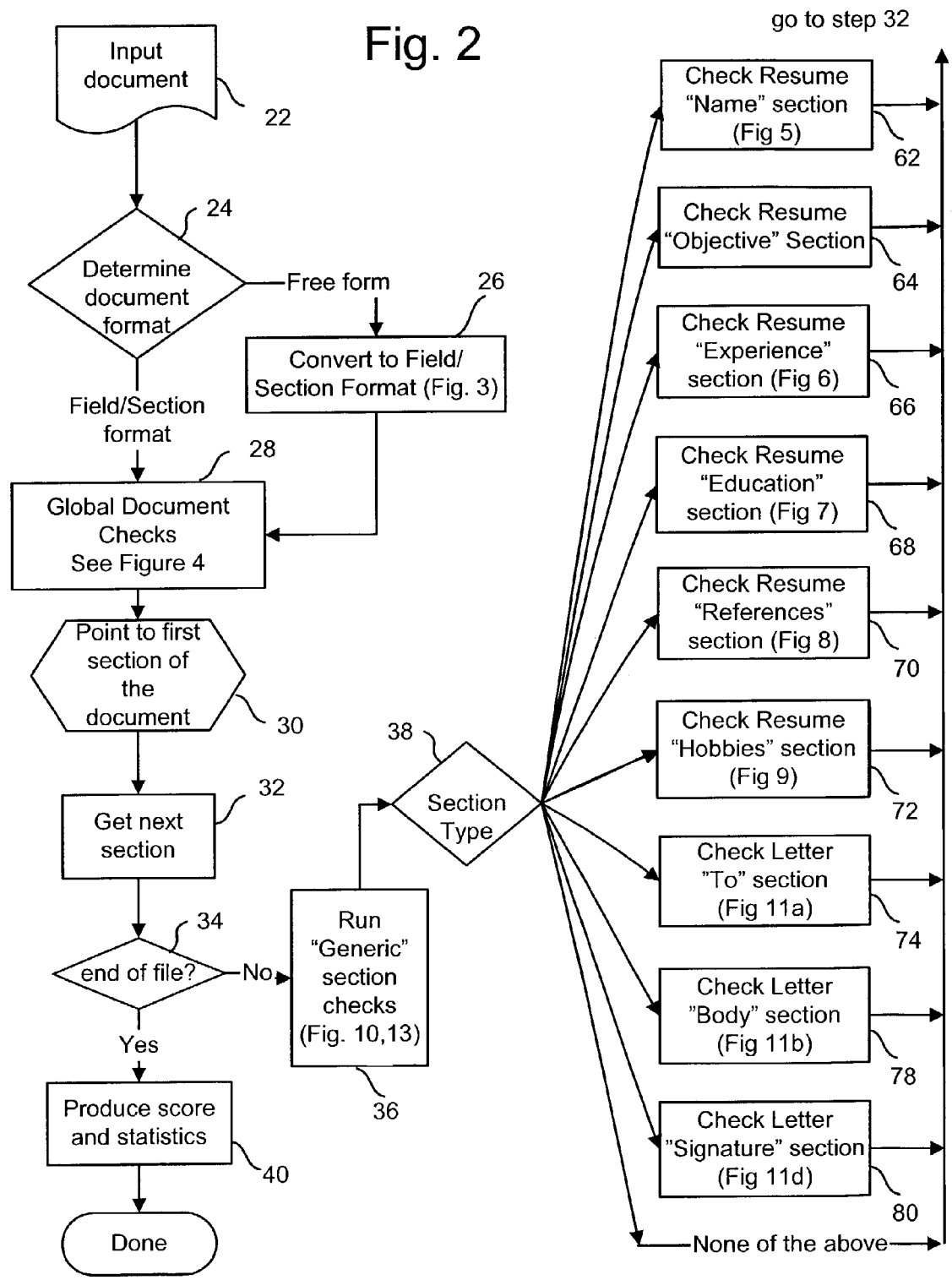
FIG. 2 is a flow chart describing one embodiment of the operation of the system of FIG. 1.

The top-level flow chart for the preferred implementation is shown in FIG. 2. In step 22, the resume or letter is received. In step 24, the system determines the document type. A "Free Form" document is parsed in step 26 into its "Field/Section" components to simplify further processing. If the document is already in this format, such parsing is not necessary.

In step 28, the system conducts global document checks—checking attributes that apply to the whole document (e.g. page layout/attributes and/or paragraph attributes), as opposed to checks it conducts on a section-by-section basis. The system then iterates (via steps 30, 32, 34, 36, 38 and 62-80) on all document sections, checking each section specifically. First, it performs checks to apply to any section in step 36 (for example, looking for web addresses and making sure they are accessible) and then it proceeds to run checks specific to this section type such as checks specific to the Name section (step 62), Experience section (step 66), Education section (step 68), References section (step 70), Hobbies section (step 72), From section (step 74) To section (step 76), Body of Letter section (step 78), and Signature section (step 80) (alternately, the signature may be provided as part of the Body section). Finally, the system produces scores and statistics that are based on processing of the whole document. For example, it may report the number of action verbs found, the total number of pages, etc. The system can also provide a report of all errors and issues. Note that in some embodiments, the reporting of errors and issues is done in real time. As seen, each section of the document is operated on with its own set of evaluations, which are based on different sets of rules. While each section may use a different set of rules, it is possible for one rule to be in more than one set of rules and, therefore, be applied to multiple sections.

Conversion to Field/Section Format

Figure 3:
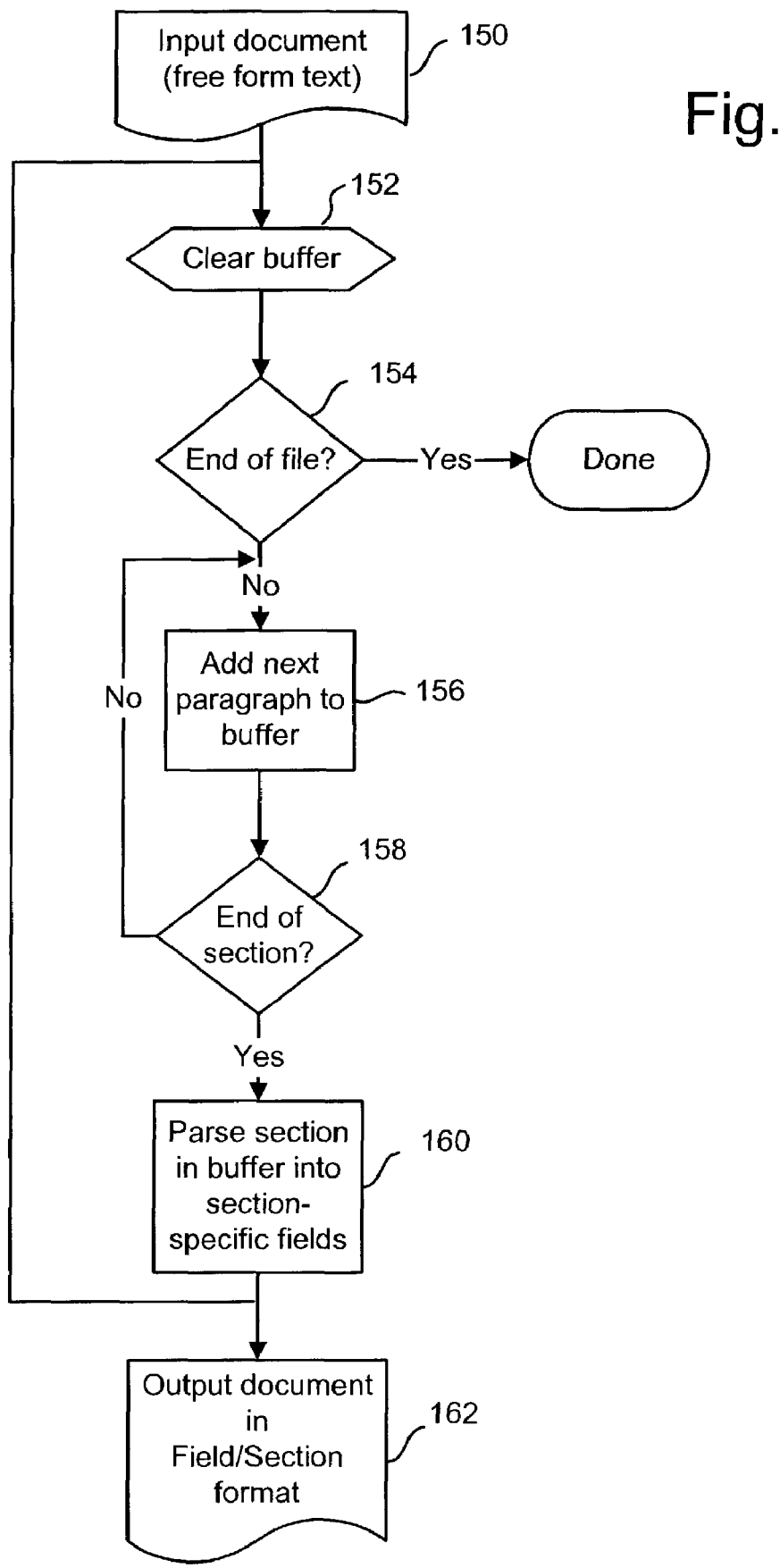
FIG. 3 is a flow chart of one embodiment of a process for converting to field/section format.

FIG. 3 expands upon step 26 of FIG. 2. The purpose of the process of FIG. 3 is to convert a free-form text resume into the desired field/section format. The conversion relies on several heuristics based on common patterns used in resumes and letters.

A letter will most often start with the sender's address, which contains easily recognizable patterns such as street address and phone number. It may also include an email address and/or a web address. The letter will typically include a date either before or after the sender's address. The recipient's address will follow, containing street address, city, state and zip, and possibly a country name. The parsing logic may use a reference list of cities, states, zip codes and countries to assist it in identifying some of the fields. After the recipient address, a phrase such as "Dear . . . " will mark the transition to the "body" section of the letter. The transition from the Body section to the Signature section is marked by the salutation, typically "Sincerely," or "Respectfully,"

Resumes are parsed based on similar heuristics. The resume is likely to start with the applicant's name, which is parsed the same as in the letter. The rest of the resume is comprised of Sections, each is preceded by a heading such as "Objective:", "Experience:", "Education:", "References:", etc. The headings can be recognized by the fact that they start on a new paragraph, a colon typically follows them, and they belong to a well known set specific to the language being processed. For example, the set includes common variations such as "Employment", "Experience", "Professional Experience", etc.

While the process of parsing plain text into fields and sections is not exact and is based on heuristics, it can be implemented with reasonable accuracy. Although this step may fail to identify some fields or sections, in particular in unusually formatted resumes or letters, the "Global Document Checks" (step 28 and FIG. 4) and the "Generic" section checks (step 36 and FIG. 10) will still perform well as they are not dependent upon specific section and field boundaries. The performance of the section-specific checks relies on correct identification of section and field boundaries, and hence will operate better when input is presented in the field/section format.

In step 150 of FIG. 3, the free form text document is accessed. In step 152, the buffer is cleared. If not the end of the file (step 154), then add the next paragraph from the input document into the buffer in step 156. If it is the end of the file (step 154), then the process of FIG. 3 is completed. In step 158, it is determined whether all of the section is in the buffer. If not, the next paragraph is added to the buffer in step 156. If so, then the system parses the section information in the buffer into specific section fields in step 160. In step 162, the new document in field/section format is output for temporary or permanent storage.

Global Document Checks

Figure 4:
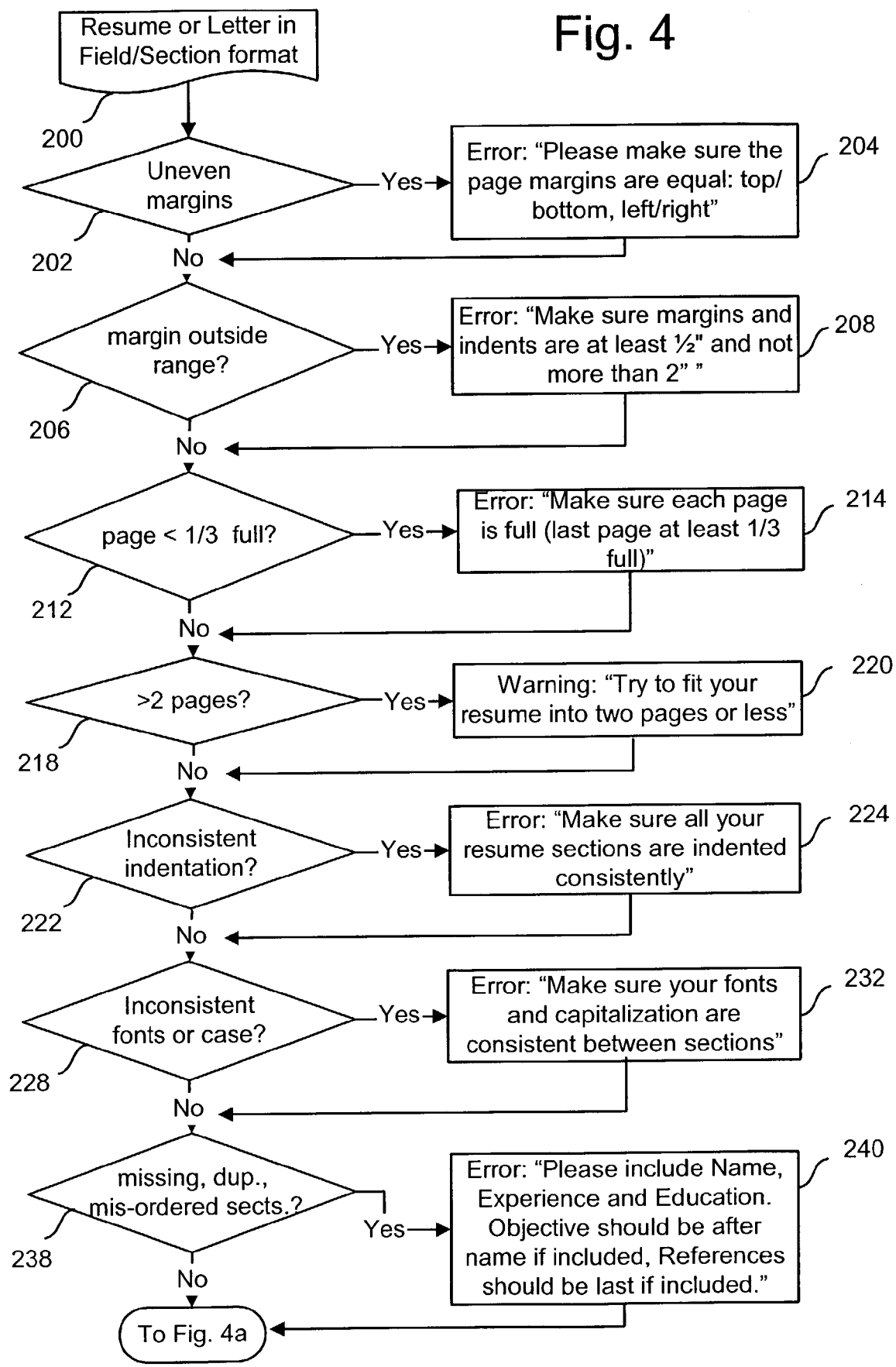

FIGS. 4, 4a and 4b show more detail of the global document checks of step 28 (FIG. 2). This series of checks are applied to the document as a whole, without regard to field/section delineation. After receiving the letter or resume in field/section format in step 200, the system checks for uneven document margins (step 202), margins smaller or larger than a certain size (step 206), last page of the resume being less than ⅓ full (step 212), resume page count that is greater than 2 (step 218), inconsistent indentation of various sections relative to each other (step 222), inconsistent capitalization of repeated items such as section headings or section bodies (step 228), missing sections such as Experience or Education (step 238), a total number of fonts used being too large (FIG. 4a, step 242), or total number of text colors used being too large (246) If any of these checks find an error, they display an error or warning message with a suggestion on how to fix the problem (see steps 204, 208, 214, 220, 224, 232, 240, 244, 248).

Name Section Checks

Figure 5:
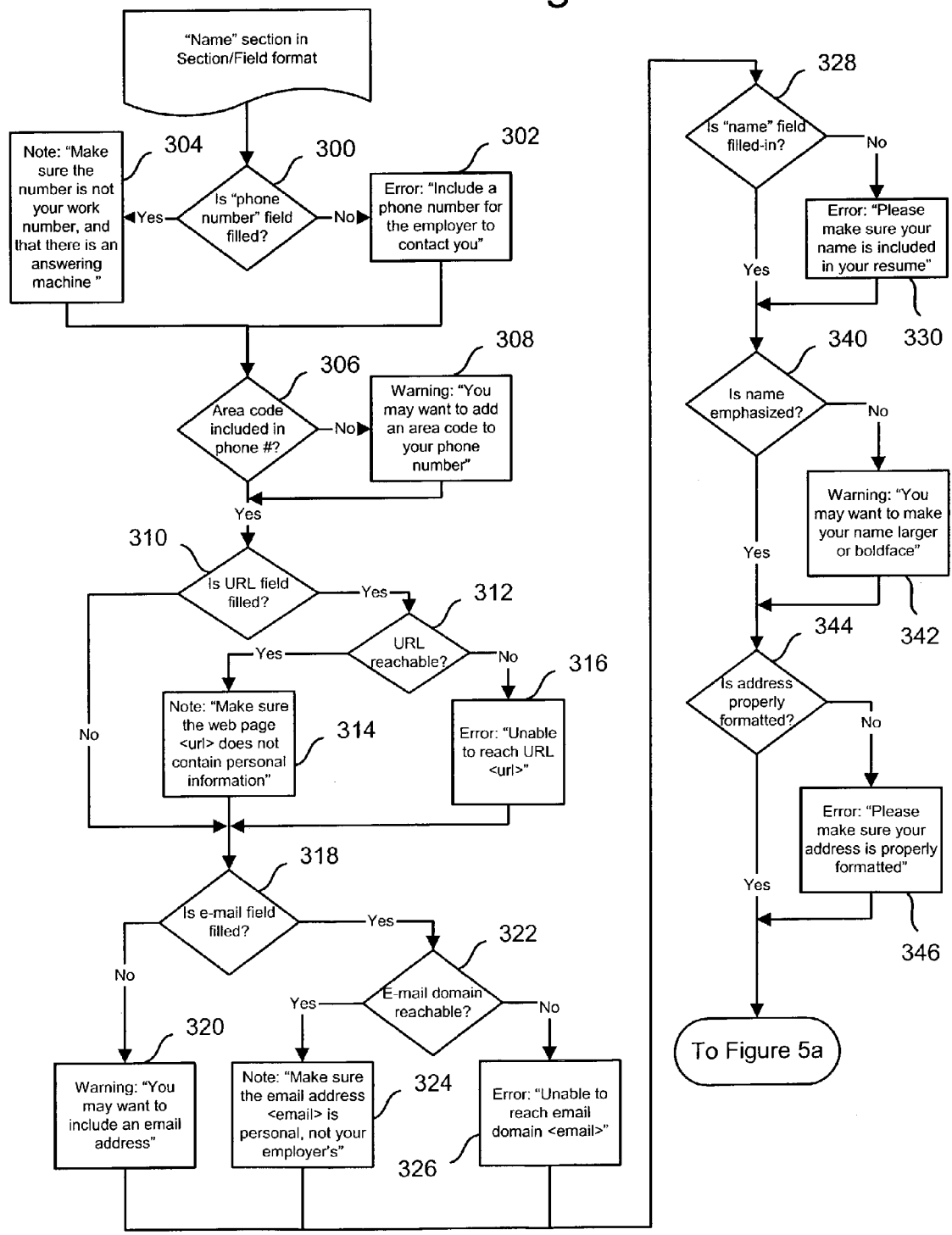
FIGS. 5 and 5a depict a flow chart of one embodiment of a process for name section checks.

One embodiment of the checks performed on the Name section is depicted in FIG. 5. If a phone number is not included (step 300), an error message is generated (step 302). If the phone number is included, its format is validated and the user is reminded not to use employer's phone number in their resume (step 304). If an area code is not included in the phone number (step 306), then a warning is generated in step 308. If a web address (or URL) is included (step 310), then the system checks to see that the page is accessible by attempting to access the page with an HTTP command or via the user's web browser (step 312), and also reminds the user that the page should be work related and not contain items of personal nature in step 314. In another embodiment, the system will provide the user with a link to the page and, after the user clicks on the link, the system will attempt to access the page. If the URL is not reachable, an error is reported in step 316. If an email address is not specified (step 318), the user is reminded to include it in step 320. If email address is included (step 318), the email is checked for validity by trying to access the mail server designated for receiving mail at the specified domain (by sending a test e-mail message to that address and/or by querying a mail server designated for that domain) in step 322. Alternatively, the user can be provided with a "mail to" tag that when selected is used to send an email to the target address. If the email address is not valid, an error is reported in step 326. If the email address is valid, then the user is reminded to only use personal email addresses in step 324.

Figure 5A:
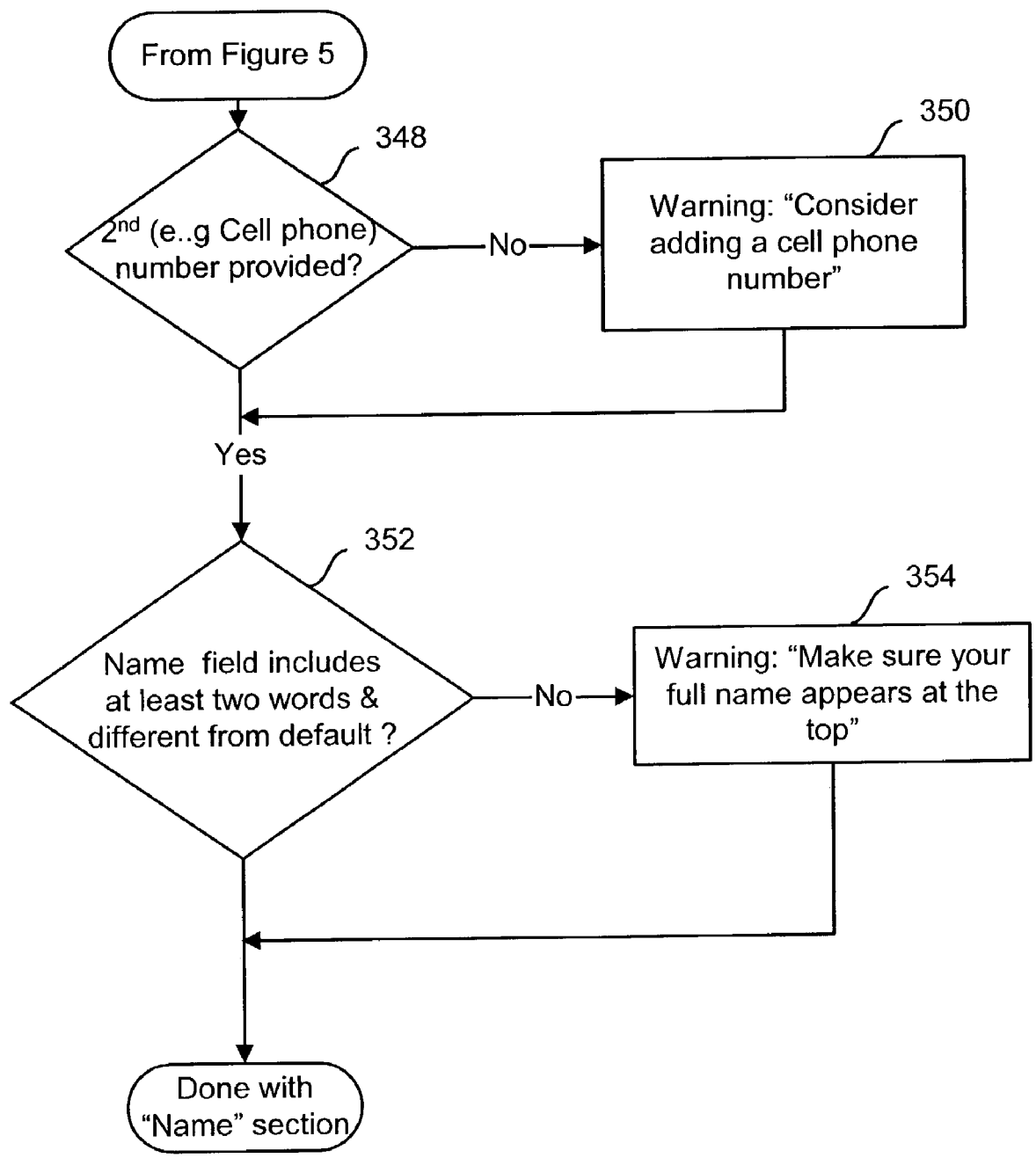

In step 328, the system verifies that the name field was filled in. If not, an error is reported in step 330. If the name was not emphasized (boldface, different typeface, larger point size or different color) (see step 340), an error is reported in step 342. If the address is not properly formatted (to contain a street address or PO box, a valid zip or postal code, etc) (see step 344), then an error is reported in step 346. In step 348 (see FIG. 5A), the system checks whether a second phone number is provided, and if not, advises the user (see step 350) to include a second number such as a cell-phone number to ensure that the applicant can be easily reached. In step 352 the system checks whether the name field is comprised of at least two words, and that it does not literally equate to the value originally present as a stand-in (e.g. "Your Name") Errors and warnings can be reported to a file, process, monitor, printer, speaker, pages, telephone, etc.

Experience Section Checks

Figure 6A:
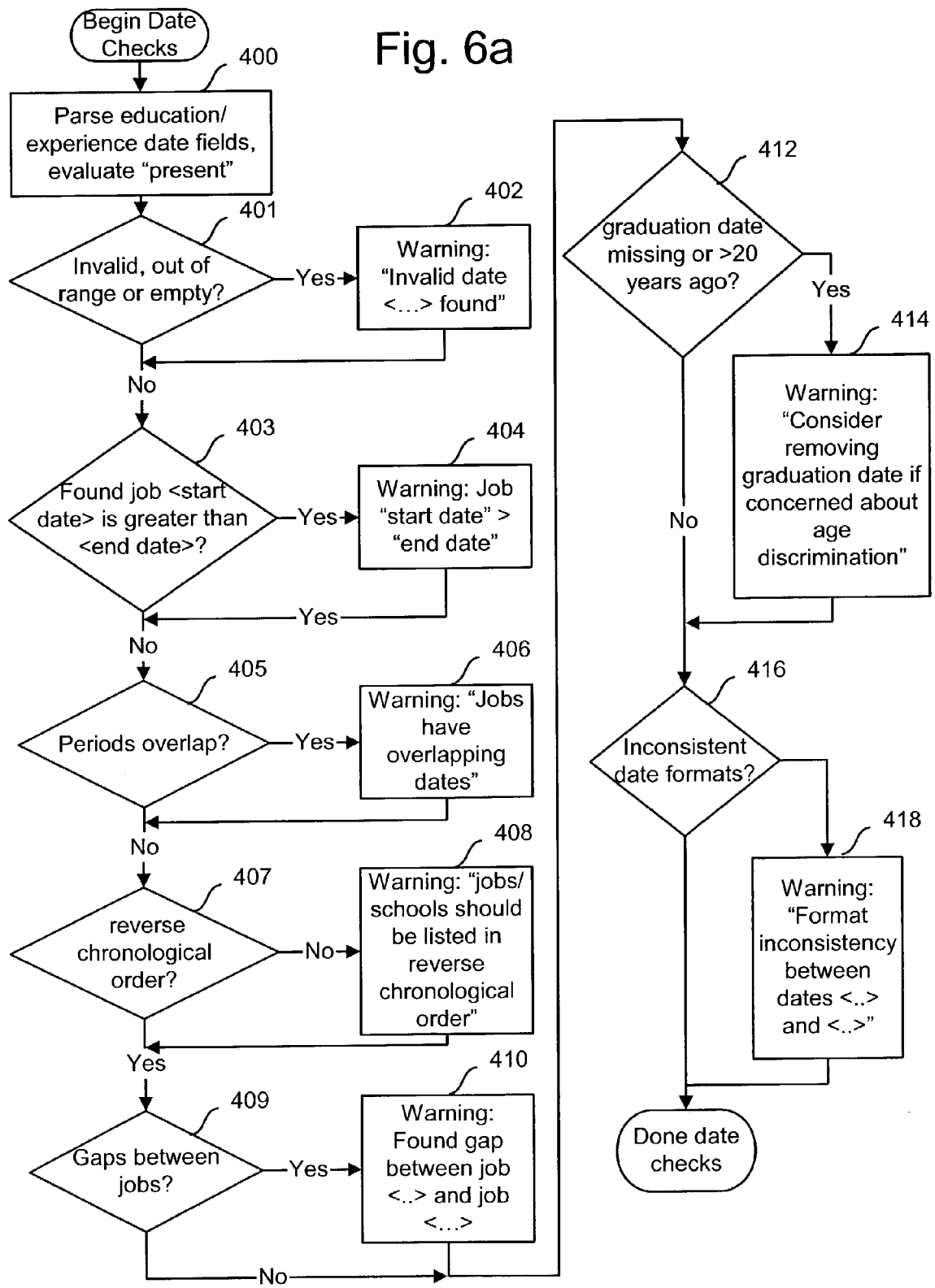
FIG. 6a is a flow chart of one embodiment of a process for date checks, used for both experience section and education section.

One embodiment of checks conducted on the Experience section is depicted in FIG. 6. The process receives the Experience section in section/field format. In step 370, it is determined whether there are more than five jobs listed in the Experience section. If so, a warning is reported to the user in step 372. In step 374, it is determined whether there is only one job listed. If so, a warning is displayed to the user in step 376. In step 378, employment dates are checked for all jobs in the experience section. This step is further expanded in FIG. 6a. In step 388, the process points to the first job in the jobs listed in the Experience section. In step 389, it is determined whether there are any more jobs to process. If not, the process of FIG. 6 is done. If there are more jobs to process then in step 390 it is determined whether the date, title, or employer fields are all filled for the particular job under consideration. If not, an error message is displayed in step 391. In step 392, any URLs and email addresses found in the description portion of the experience are checked to be valid and accessible, as discussed above. After step 392, the process loops back to step 389. If it is determined that there are more jobs to check, the next job is checked by repeating steps 390-392.

Date Checks

The date checks are generally common to both the Experience section and the Education section, since both are expected to contain entries with valid dates in reverse-chronological order. Each job may indicate a single date such as a year, or a pair of dates corresponding to the start and end dates of the position. The end date of the most recent position may be "present." In an Education section, each school will typically have one date field corresponding to the graduation date, although some implementations may designate two fields to indicate start and end dates for that education time period. Typically a candidate who has graduated will only indicate graduation year, where a non-graduating candidate may indicate the years during which they attended the school or college. While the overall logic for date checks may be shared between Experience and Education, the logic may take slightly different paths depending on which case it is. In step 400, dates are parsed from their text format to a more exact representation. This parsing must allow for a wide variety of acceptable formats, such as "year only", "month and year", and even, though less common, "day, month and year." Further, it must allow for sub-types within these types, as there are many valid ways to indicate a date on a resume. For example, the following are all valid formats: "2000", "October 2000", "October 2000", "1 Oct. 2000", "Oct. 1, 2000", and even its European equivalent "1 Oct. 2000", depending on the locale. The value "Present" is also considered a valid date when used as the end-date of a recent job, and is equal to today's date for comparison purposes.

If the dates read are invalid, out of range, or cannot be properly recognized and/or translated (step 401), then warnings are generated in step 402. Great care must be taken to parse as many date representations as possible to avoid annoying error messages at this stage. Also, unlike a standard computer date which contains exact day and even time, the parsed dates may only indicate a year, a month and a year, or a day, month and year. Flags are used to indicate which fields within the parsed date are valid. Also, special comparison logic is used for comparing this special type of dates. For example, "Jan. 10, 2002" is Greater Than "Jan. 8, 2002", but is not necessary greater than "1/02" or "2002".

In step 403, the first date test is applied—making sure that the "Start Date" of a job is not greater than the "End Date" of that job. This test is only applied to Experience section and is only used if both Start and End dates are specified. There is also a related case where only one date is specified for a job, such as "1998". It is valid to specify a single month or year as the time period for a job, but using a single month or day is not recommended as it may suggest that the job lasted only one month or one day. The special date comparison logic is used to take into account valid dates that contain only year or only month and year.

In step 405, the period of each job is compared against the period of each other job, in search for overlaps between jobs. Such overlaps are reported in step 406. An overlap may not indicate an error as it is entirely possible for a person to hold more than one job at one time. When an overlap is detected, the error message is properly qualified to indicate that this may or may not be a problem.

In step 407, the jobs or schools are checked for ordering of their dates. If the dates are not reverse-chronological (that is, most recent job or school first), a warning is reported. Note that in case of Experience section where both start and end date are specified, we are comparing date-pairs, or date-pair to a single date. The comparison is not difficult because we can assume that the end date is always greater than the start date, since any case to the contrary was already reported in previous step as an error. Likewise, we need not worry about overlaps since those were already reported in previous steps. Hence, when two dates are specified, step 407 may use the end date for comparison and ignore the start date.

Step 409 checks for possible time gaps between jobs. Again, building upon previous checks and error reports, one can assume that the jobs are already ordered in reverse-chronological order and that they do not overlap. Hence one need only compare each job's duration to the next job's duration when looking for time gaps. A more elaborate scheme could also be used, where gaps are properly evaluated even if the jobs are not pre-sorted. This would be done by creating a special set of sorted jobs and then running this test on them. Time gaps may not necessarily be an error but they will catch the trained eye of an employer. Step 410 reports such gaps and gives the user an opportunity to correct them if they are indeed an oversight.

Step 412 is unique to the Education section. Older candidates may not want the potential employer to know their age, yet a graduation year that is 20 years or older could give away their estimated age. Hence step 412 checks graduation date and if it is older than a pre-set number such as 20 years, a warning is issued in step 414 and the user is advised to consider dropping the date. Likewise, a missing graduation date is also reported as a warning and the use is advised to determine if he/she should or should not include such date.

In step 416, date formats are compared to each other. While the user is allowed to use a wide range of date formats, once chosen, the date format should be consistent throughout the section and preferably throughout the resume. Hence a job that starts on "June 1998" and ends on "3/99" would create an error message, while a job that starts in "1998" and ends in "1999" will not generate such error. One may also allowed for some dates to contain month and year, while others contain only year, as long as common format is used. In that case, a job that starts in "1998" and ending in "June 1999" may be acceptable. This type of dates are used when applicants are trying to hide short periods of unemployment, or mask the fact that a job did not last more than a few months. A check that is too tight and stringent would cause user frustration, and hence the check may apply a reasonably wide acceptance criteria for dates.

Education Section Checks

Figure 7:
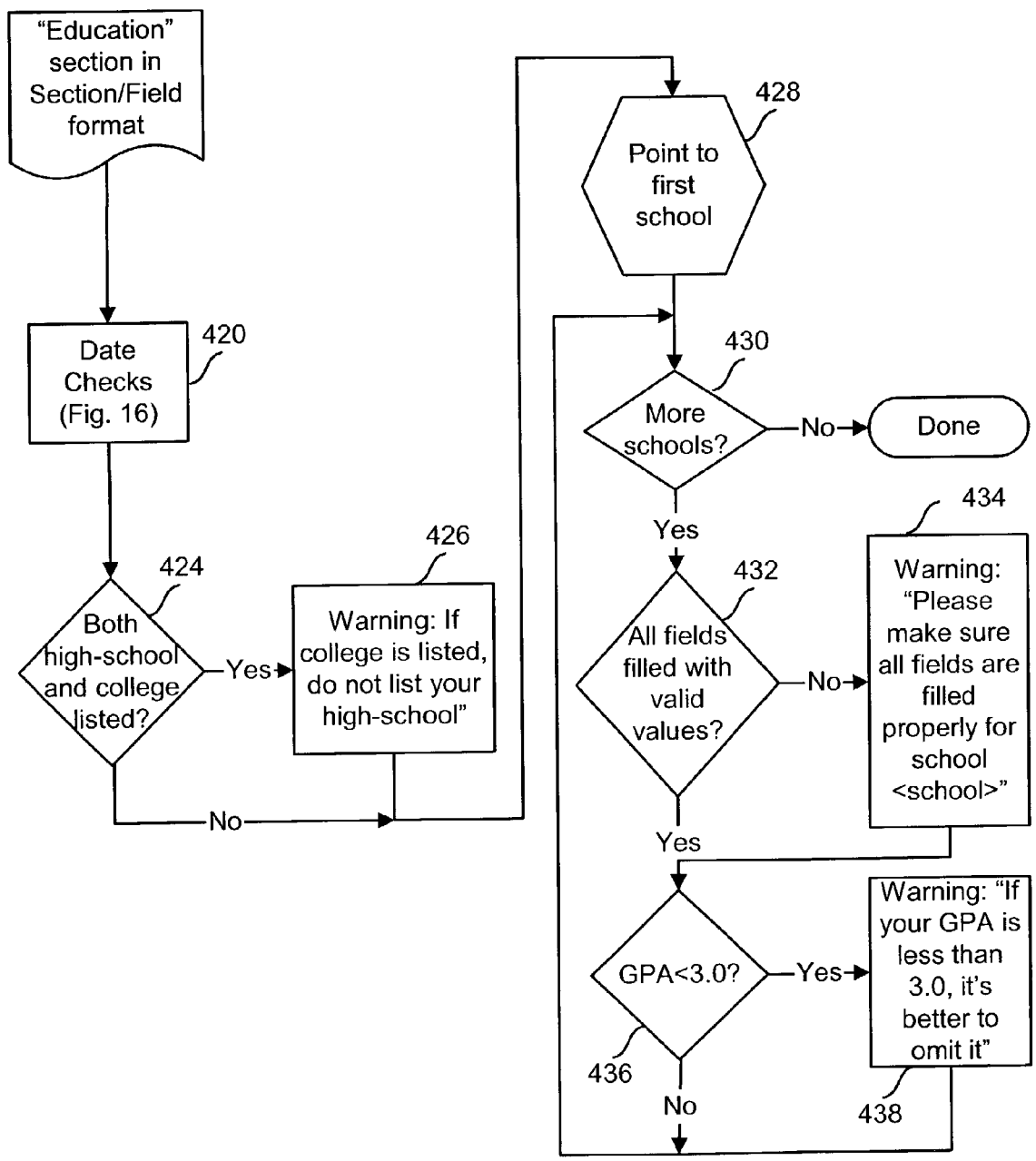
FIG. 7 is a flow chart of one embodiment of a process for education section checks.

One embodiment of the checks conducted on the Education section of the resume is listed in FIG. 7. Step 420 applies the relevant date checks depicted in FIG. 16 as described above. Step 424 checks if the Education section contains both a high-school and a college. A high school is recognized by the word "High School", while a college is recognized through words such as "College" or "University". If both a college and a high school are specified, a warning is generated in step 426 and the user is advised to eliminate the high-school.

In step 428, the process points to the first school listed in the Educational Experience section. In step 430, it is determined whether there are anymore schools to process. If not, the process of FIG. 7 is completed. If there are more schools to process, then in step 432, it is determined whether all fields within the current listing of the current school being processed are filled in. If not, a warning message is reported in step 434. In step 436, it is determined whether the listed GPA is less than 3.0. This is done by looking for the pattern "GPA", "G.P.A", or "Grade Point Average" and a decimal number adjacent to the pattern. If so, a warning is reported to the user that indicates that if the GPA is not 3.0 or better, then it should be omitted. After step 436 (step 438), the process loops back to step 430, points to the next school listed, and repeats steps 432-438 if there are more schools to consider.

References Section Checks

Figure 8:
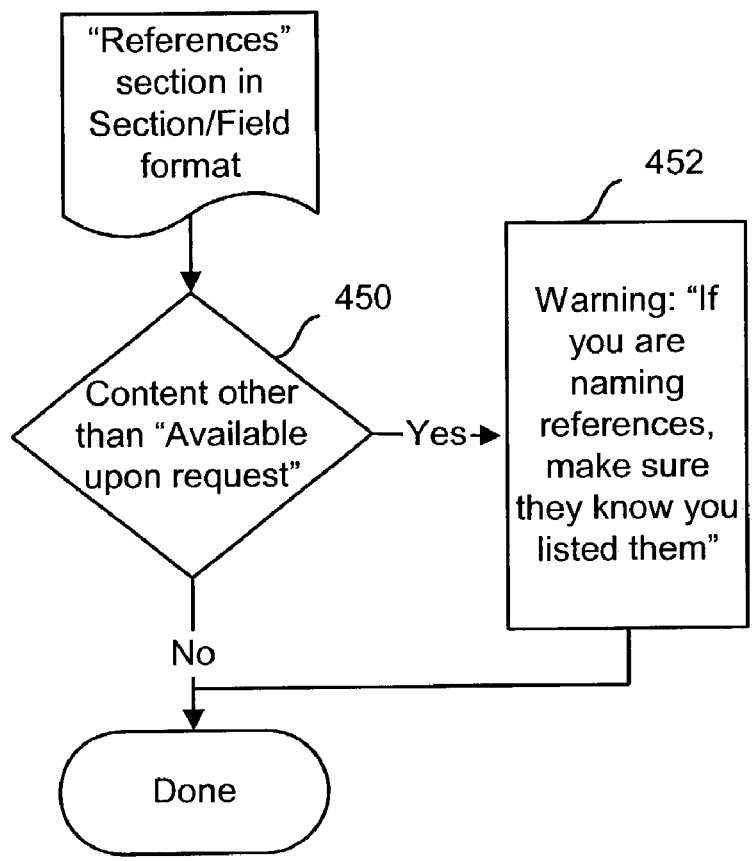
FIG. 8 is a flow chart of one embodiment of a process for reference section checks.

One embodiment of the checks conducted on the References section of the resume are depicted in FIG. 8. The References section usually contains the phrase "available upon request" or "references available upon request." However, some applicants may include other text, which is likely to be names of references. One implementation looks for the following condition—the word "Request" should be present, and there should be no more than 6 words in total. This allows for a wide range of acceptable formats while ensuring that the user did not list a number of persons as references. Other implementations may be more stringent and look for specific acceptable words for this section. If the content includes text other than the traditional "available upon request" (step 450), then the system reminds the user to make sure that these people have agreed to be their references and are properly briefed to avoid any surprises in step 452.

Hobbies Section Checks

Figure 9:
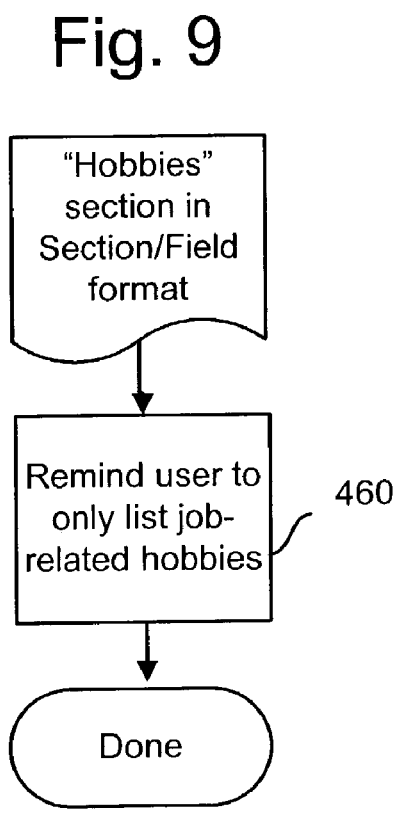
FIG. 9 is a flow chart of one embodiment of a process for hobbies section checks.

One embodiment of the checks conducted on the Hobbies section of the resume are depicted in FIG. 9. Independent of the content, the user is reminded to only list job-related hobbies in step 460.

Generic Section Checks

Figure 10:
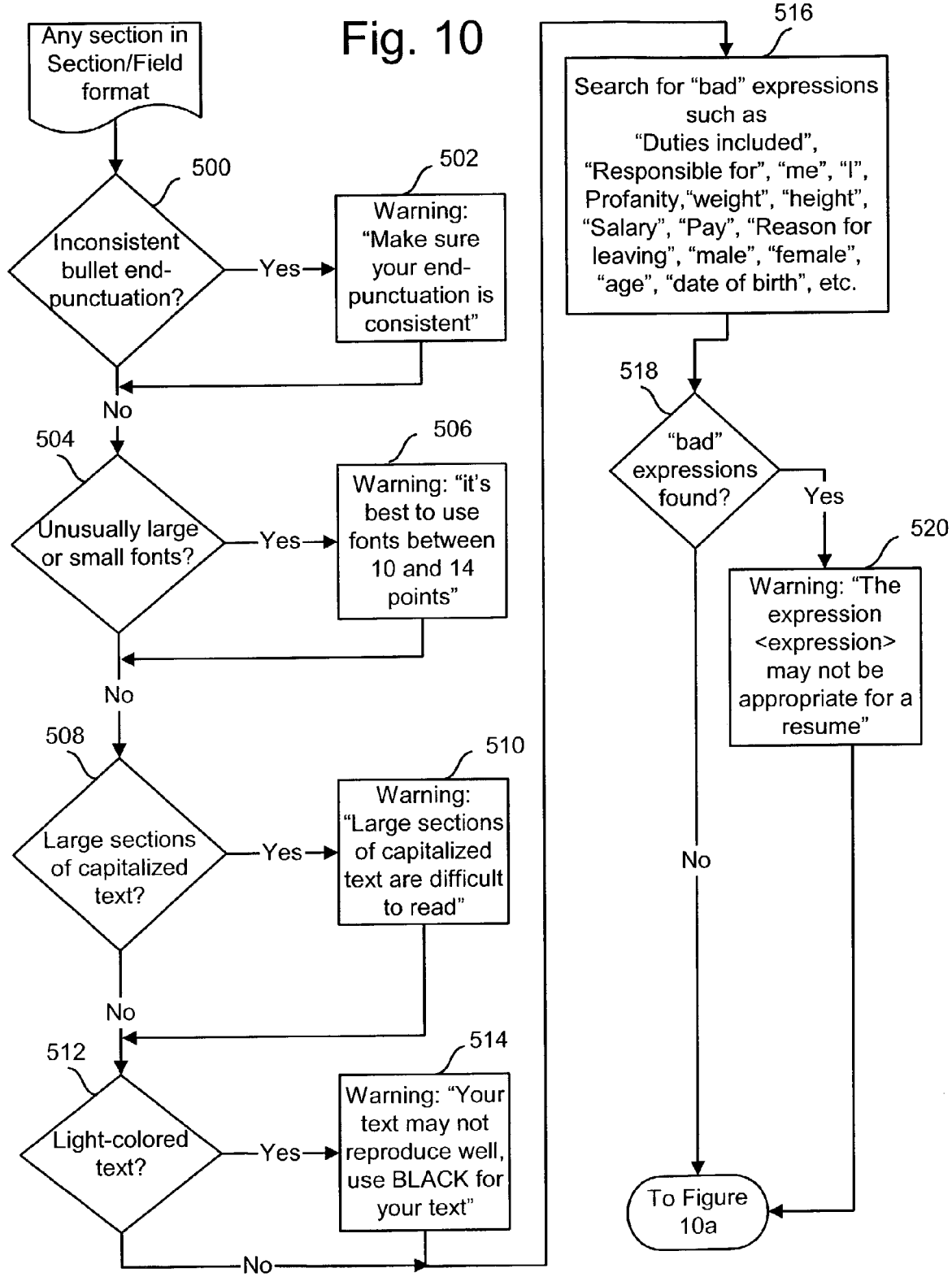
Figure 10A:
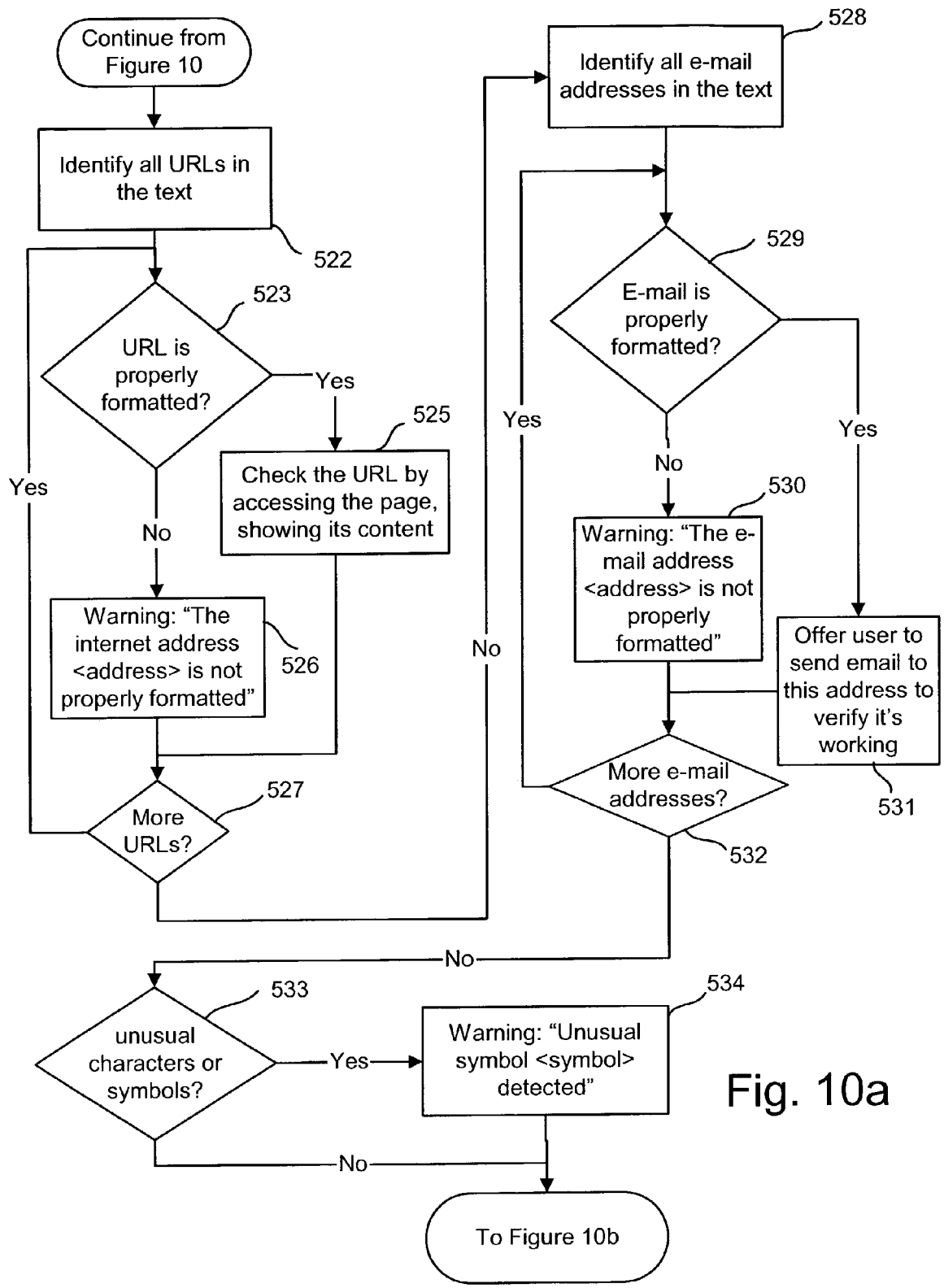
Figure 11A:
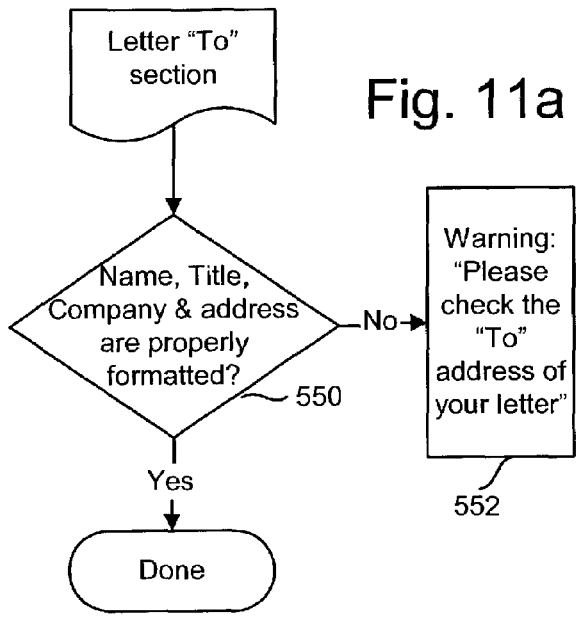
FIGS. 11A-D are flow charts for checks of cover letters.
Figure 11C:
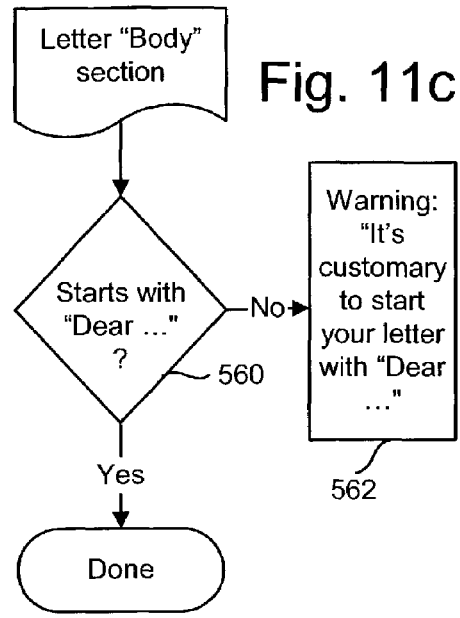
Figure 11B:
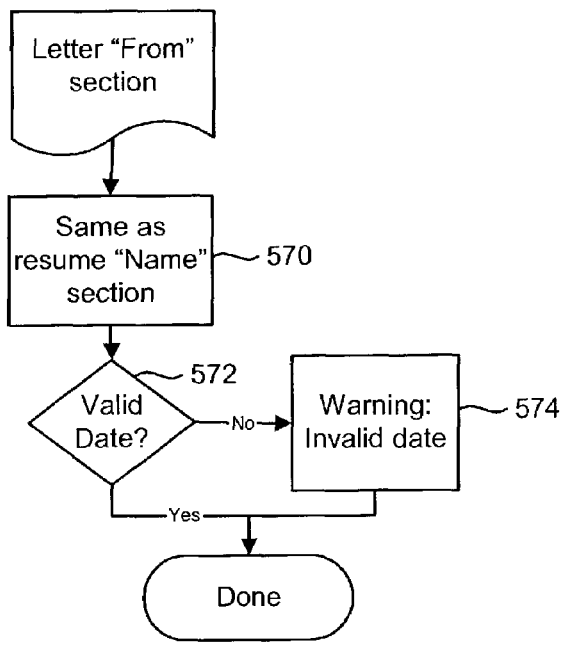
Figure 11D:
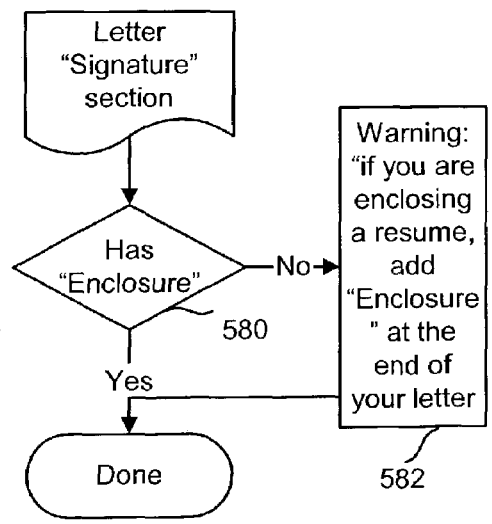

One embodiment of the generic checks conducted on all (or a subset) of the sections of the resume or letter are depicted in FIG. 10. In step 500 of FIG. 10, the system checks for inconsistent bullet end punctuation. That is, the system verifies that all bullet items have consistent end punctuation. If not, then in step 502 a warning is displayed to the user to make sure that the end punctuation is consistent. In step 504, the system checks to determine whether there are any unusually large or small fonts. If so, a warning is displayed to the user in step 506 to use fonts between 10 and 14 points. In step 508, the system determines whether there are large sections of capital text. If so, a warning is generated in step 510 about low readability. In step 512, the system determines whether there is light-colored text. If so, a warning is displayed to the user in step 514 that such text will not reproduce well and suggests that black be used. In step 516, the system checks for various words and expressions that have no place in a resume or letter, such as "duties included", "responsible for", "me", "I", profanity, the words weight, height, salary, pay, reasons for leaving, gender words such as male and female, etc. If any of these expressions are found (step 518), then a warning is displayed or reported to the user in step 520.

In step 522, all patterns that appear to be URLs (even with slight syntax problems) are identified. For example, "http://my*company.com" would indicate that the user wanted to include a web address, although this is not a valid URL. In step 523, the potential URLs are checked for valid syntax. Invalid URLs are reported in step 526. For valid URLs, the system tries to retrieve the page, thus finding if the page is accessible and giving the user an opportunity to verify that the page is indeed the one they intended. Step 527 causes the process to repeat for each potential URL.

Step 528 identifies patterns that appear to be e-mail addresses, even if they are not syntactically correct. For example, joe@ab*c.com is likely to indicate that the user wanted to use an email address, yet it is not a valid e-mail. In step 529, the potential email address is checked for syntax and syntax errors are reported in step 530. If a valid email address is found, it may be tested in step 531 by contacting the e-mail server or by sending an email to that address. The user should be consulted before an email is sent. Step 532 causes the process to repeat for each potential e-mail address.

Step 533 checks the text for unusual characters that could have been inserted in error by the user, such as "~", "\", etc. It may also look for symbols that are unique to a particular symbol typeface but may appear completely different after being exported to another typeface (e.g. when sent as e-mail). Such errors are reported in step 534. In general, the approach to text is very conservative to make sure that the resume or letter will remain readable even after they are transformed through e-mail or export.

Step 540 in FIG. 10b looks for sections that are present but completely empty. For example, a user may start their resume with a template that has an empty Experience section or an empty Education section, and leave that section unfilled. This error will be reported in step 541.

Step 542 looks for pictures that are included in the resume or letter. It makes not attempt to determine the content of the picture, but advises the user in step 543 not to include their own portrait in the resume or letter, unless they are in a very specialized field such as modeling.

Step 544 looks for remnants from a resume or letter template, where certain fields were left empty for the user to fill in. For example, <your profession> is a template for the user to fill-in their profession. If such literal value is found in the text, it is reported in step 545.

Step 546 looks for jobs or schools where only skeleton information is provided but no description is included. A job with employer, title, dates but no other description will qualify. A more common case is a school/degree pair without any further information. The user is advised in step 547 to elaborate on this job or school if space allows. Step 548 executes a spell check and possibly grammar check on the whole document and reports any errors.

Letter Checks

One embodiment of the checks applied specific for letter sections are depicted in FIGS. 11A-D. Step 550 checks the "To" section of the letter for a properly formatted name, title, company name, address, zip/postal code etc. any error is reported in step 552, if necessary. The "From" section of the letter is checked for the same criteria as the Name section of the resume in step 570. Step 572 checks that the letter date is valid, and reports any errors in step 574. See FIG. 5 for information about checking the Name section. The Body section of the letter is checked to make sure it starts with "Dear" (see step 560 of FIG. 11C). If the Body does not start with "Dear" (step 560), then a warning is reported in step 562 that a letter is customarily started with the word "Dear." A letter may include a separate "Signature" section or the letter signature may be part of the Body. The appropriate section of the letter is checked to make sure that it includes the phrase "Enclosure" or its abbreviation "Enc." (step 580). If it does not include an indication of an enclosure, then a warning is generated in step 582 to indicate that an enclosure is included if the user is including a resume with the cover letter.

Score and Statistics

The score and statistics are designed to give the user as much information as possible, yet allow them to determine in a glance the number and severity of errors detected in their document. The user may iterate through the checking process several times, so a quick summary of the errors is of great benefit. One particular embodiment produces a report on the screen and also allows to print or export the report. In this particular implementation, there are three types of messages—"alerts", which are potentially severe errors, followed by "warnings", and "notes". "Notes" may be completely benign and a note should be considered as an advisory rather than an error. The top of the report in this particular embodiment indicates number of alerts, warnings and notes, number of words in the document, number of quantitative expressions, number of action verbs, etc. Following that header there is a list of the most severe messages—"Alerts", followed by a list of "Warnings" and a list of "Notes". For example, a case of missing user name on a resume will be reported as an "Alert", a date overlap between two jobs will be a "warning", while a detailed list of action verbs used will be reported as a "Note".

Figure 12:
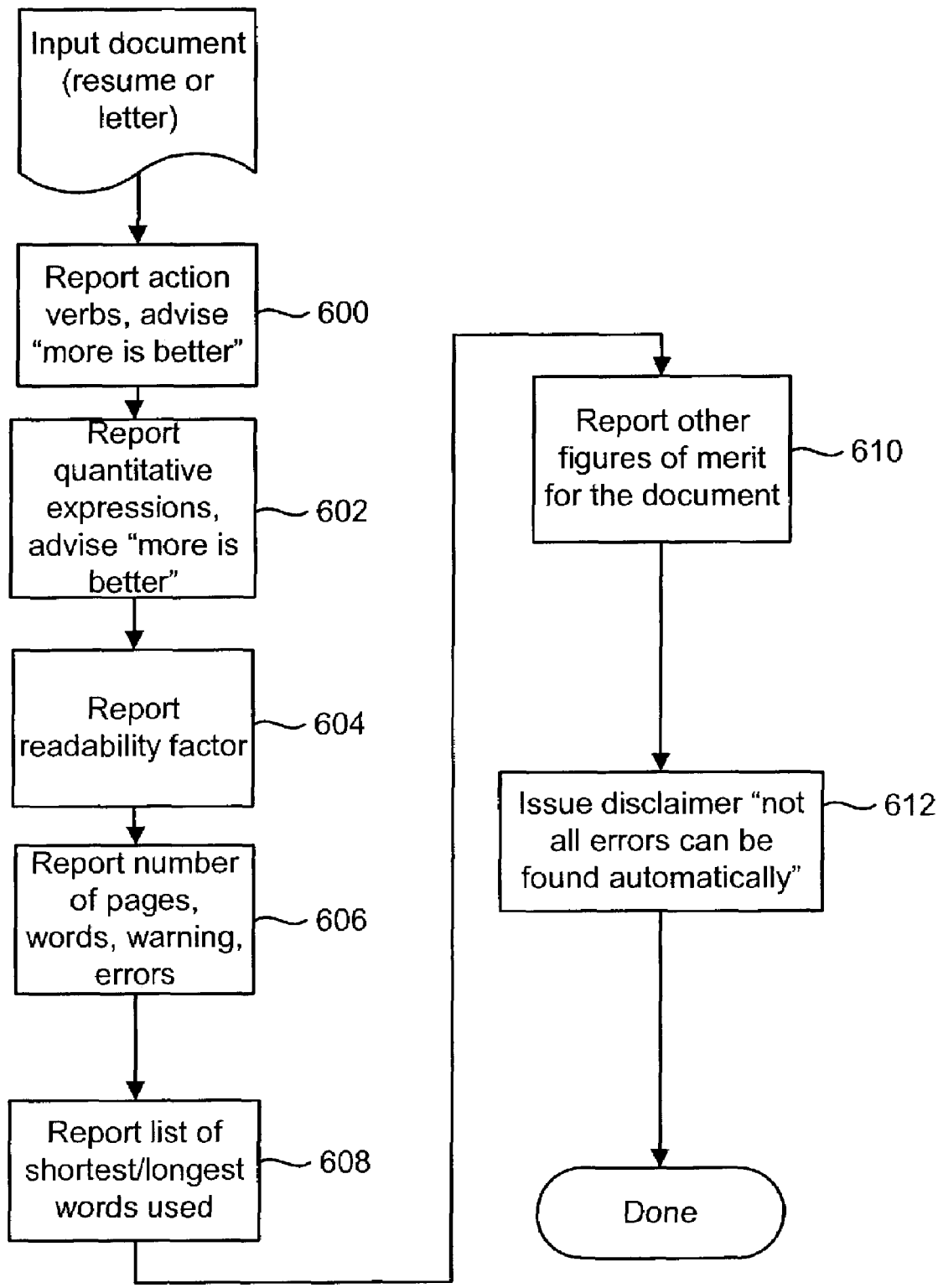
FIG. 12 is a flow chart of one embodiment of a process for producing a score and statistics.

One embodiment of the process for producing a score and/or statistics is depicted in FIG. 12. The program produces various figures of merit about the resume and letter, such as number of action verbs used, number of quantitative expressions ("managed 10 employees", "increased revenue by 30%"), readability factor (a function of white space and fonts used) and other figures of merit describing the resume and/or letter.

In step 600 of FIG. 12, the system reports the number of action verbs in the cover letter, resume or other document. In step 602, the system reports the number of quantitative expressions found by looking for patterns such as "One", "Two", "Percent", etc. In step 604, the system reports the readability factor based on how many readability error messages were generated (described above). In step 606, the system reports the number of pages and number of message by severity: "Alerts", "Warnings" and/or "Notes". In step 608, the system reports a list of the longest and shortest words found in the document, based on the expectation that very long words and very short words are more likely to be part of an error or typo. In step 610, the system can report other figures of merit for the document as customized by user or by anyone implementing the present invention. Step 612 produces a general warning and disclaimer advising users not to rely solely on the system to verify their resume and letter, but read their document carefully and possibly enlist the help of friends.

An alternative method of handling the various messages is to show one message at a time to the user, allowing them to decide whether they wish to correct the error. It can then offer them the option to correct the error within a dialog, or take them to the document editing environment at the appropriate context for fixing the error. Yet another method could offer a "hot-link" from the error report into the specific context of the error so the user can jump there with a single click and correct the error. Yet another method could offer hot-links that lead to help documents that further expand on each error.

In one embodiment, a dialog box will be displayed while the above described tests are run. The dialog box will display which test is currently being run. In one embodiment, the dialog box will also indicate the results of the tests in real time.

Figure 13:
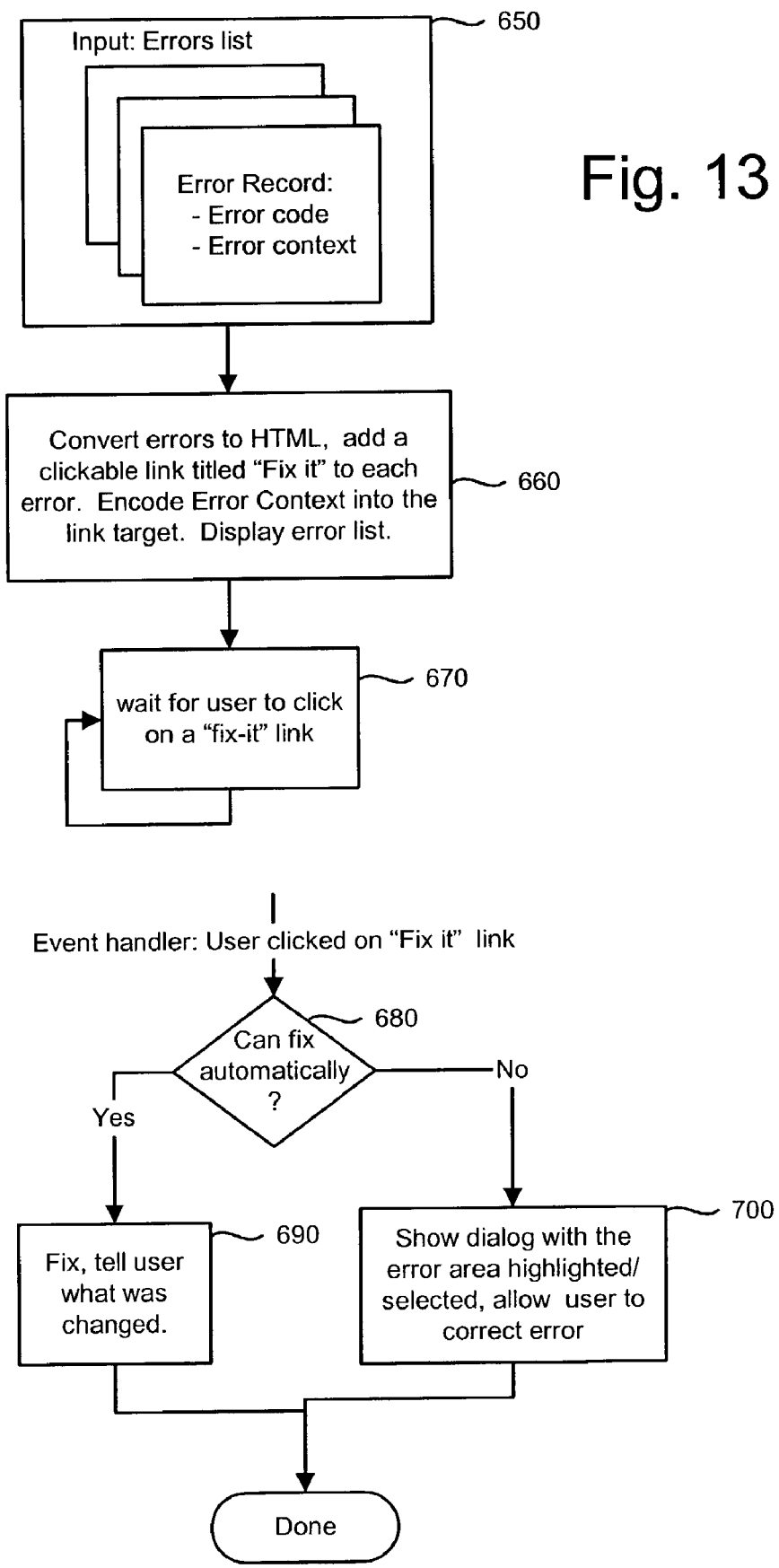
FIG. 13 depicts one embodiment of a process for converting error messages from an internal form to a user-readable form, and handling of the user's request to correct an error.

In one embodiment the system will internally store information about each error it found. FIG. 13 depicts one embodiment of a process for converting error messages from an internal form to a user-readable form, and handling of the user's request to correct an error. The various check routines (checking for text problem, font problems, etc) have already produced error records in an internal format (650), which contains an Error Code and an Error Context. The Error Code is simply a key into a text-based error table, where each key directly corresponds to a specific text message. The Error Context provides error-specific information on where the error is and how to fix it. For example, if the error was caused by a particular word within a field, the Error Context would be a pointer to that field, the character index of the word in question and the length of the word. If a font that is too light caused the error, the Error Context would identify the font in question by its relative number in the font table. This Error Context allows us to find the error and correct it intelligently when asked by the user.

Step 660 implements the conversion of error records from the internal Error Code to a user readable format. The error code is looked up in a table and converted to a plain text message. A clickable link is added, with the user-readable text "Fix Me", referring to the action of fixing this error. The target of the link includes an encoded form of the Error Context, thus allowing us to invoke an error-correction user interface. The links are displayed to the user a part of step 40 of FIG. 2. In other embodiments, instead of using a link, other user input elements can be used such as a button, an image, etc.

Step 670 depicts the program waiting for the user to click on any "Fix It" links. Once the user clicks on a link, step 680 determines whether the error can be fixed automatically, based on the Error Context information encoded into the link. If the error can be fixed automatically, step 690 will fix the error and report what it has done. If the error cannot be fixed automatically, step 700 will invoke a user interface that allows the user to change the document to fix the error. The user interface is driven by the Error Context information.

The specific method for automatic error correction will vary depending on the type of error encountered. For example, if the error involves text that is too light, the automatic correction would change the text color to the color of the surrounding text that is not too light, or, if none found, it will change it to black. In case of a left page margin that is too narrow, the automatic correction will change the left margin to an acceptable value such as 1", and will also change the right margin so that both margins are equal. In case of a font that is too small, the automatic correction will change the font size to the size of the surrounding text that is properly sized, or, if none found, will change it to a default size such as 11 points. If the error involves the person's name on the resume not being emphasized by boldface or larger font size, the automatic correction will apply a larger font size and/or boldface attribute to the name. In case of an employment date that is correct on its own but does not conform in its format to the other dates, the automatic correction will re-format the date to conform to the format of other employment dates in the resume.

FIG. 13 describes how an error can be displayed in a report form, and corrected via a "Fix It" handler. An alternate way of displaying and correcting the error is through an interactive user interface such as a dialog, which displays one error at a time and offers to user to fix that error. This is similar to the way a typical spell-checker operates, offering the user the opportunity to see the misspelled word and choose from several possible actions such as "delete duplicate word", "ignore", etc. For example, in the case of a bad date, this approach will show the user the date(s) that caused the error, explain the problem, and allow the user to choose an automatic fix, if applicable, or enter a correct date by typing it into a field. In case of a text that is too light in color, the user will see a dialog that allows to modify the color of this particular text.

Note that the above discussion and the included figures describe the disclosed individual tests in a particular order. However, various implementations may differ in ordering of operations and in hierarchical structure. The order or hierarchy of execution is not critical to the operation of the invention.

Accordingly, it will be seen that this invention provides for the creation and editing of more effective resumes, coverletters and other documents. The system is adapted with a rules database containing information relating to the characteristics of a "correct" and effective resume. It will be appreciated that the features of the invention were embodied by way of example, and not of limitation, and that one of ordinary skill in the art may implement a number of variations thereupon without departing from the teachings of the invention as claimed.

Below is described one example of an implementation of the present invention.

This particular implementation uses a 3-step "wizard" interface to check a resume or letter for errors. The first step of the wizard tells the user about the checking feature. The second step of the wizard executes the checks and indicates progress to the user via a progress bar and text messages. The last step of the wizard displays the results.

Since the implementation includes a large number of checks, the checks are implemented as a tree of "Check" procedures, where some "Check" procedures may in turn call other "Check" procedures that are more specialized. The typical structure of a "Check" procedure is one of the following:

1. <Procedure name>(pointer-to-a-section, pointer-to-a-sub-section, pointer-to-results-set)

If the pointer-to-sub-section is NULL, then this procedure will check the specified section (e.g. Experience) for section-level attributes. If the pointer-to-sub-section is not null, then the same procedure will check the specified sub-section (e.g. a specific job within the Experience section).

2. <Procedure name>(pointer-to-document, pointer-to-results-set)

This procedure will check the document as a whole for global attributes such as margin size or consistency of headings.

Check procedures may be applied to a Resume document or to a Letter document. There are different error messages for Resumes and for Letters, and the proper message is chosen depending on the type of document being checked. Some checks apply only to resumes, while others apply only to letters or to both letters and resumes.

For each section, the program invokes the "Section Check" procedure passing to it a pointer to the Section and a NULL for the Sub-Section. For each Sub-Section of this Section, the program then calls the "Section Check" procedure again, passing it a Section pointer and a Sub-Section pointer. This is repeated for all sections/subsections. When all the sections/subsections were checked, the program invokes the "Document Check" procedure. Document Check is done last because it uses information collected by the Section Check procedures, such as the list of action verbs and the list of quantitative expressions.

The execution of a "Section Check" (for section or sub-section) or a "Document Check" is called a "Step," Steps are a user-visible events used to advance the progress bar that the user sees on the screen. A timer is used to trigger the execution of each Step. Hence, the user sees a progress bar that moves at approximately a constant pace, and the user interface remains responsive between the individual steps.

The "Section Check" Procedure calls more specialized check procedures to implement the following checks:

1. "Text Checks"
2. "Name Checks"
3. "Education Checks"
4. "Experience/employment Checks"
5. "Date Checks"
6. "Letter 'To' Section Checks"
7. "References Checks"

As indicated above, the "Section Check" can be invoked to check a Section or a Sub-Section. The same is true for the more specialized check procedures that it calls.

The "Text Checks" procedure(s) are applied to the text content of each resume section and the fields of its underlying sub-sections. For example, in case of an Experience section, these checks will apply to the section heading "Experience" as well as to each job sub-section and the text fields that describe that particular sub-section such as employer name, job title, etc.

The checks include:
1. Check for text color too light
2. Check for font size too small
3. Check for unusual symbols or characters
4. Add any action verbs to a global list
5. Add any misspelled words to a global list
6. Check for prohibited single words such as "age", "male", "female", etc.
7. Add any quantitative expressions (e.g. "five") to a global list
8. Check for prohibited multiple-word expressions such as "Duties included"
9. Check for empty fields delineated by angled brackets, such as "worked for <number of years>"

"Name Checks" procedure(s) perform the following checks:
1. Check for an empty "Name" field
2. Check for "Name" that equals the default value "Your name"
3. Check for empty "email" field.
4. If email is included, advise user not to use employer's email
5. Advise user to verify that the e-mail address is correct and can be reached
6. Advise user to ensure that an answering machine is connected to each listed phone
7. Check that phone number is included
8. Check that a cell phone number is included by looking for the string "Cel" in the phone numbers
9. Check that the name is comprised of more than one word
10. If a phone number is listed, advise user not to use employer's phone
11. Verify that phone numbers include area code
12. Check that street address is not empty
13. Verify that there is a valid zip/postal code
14. If a web page address is included, advise user to verify that the information in the page is appropriate
15. If a web page address is included, create a clickable link to that page and advise the user to verify that the page is accessible
16. Verify that the Name field is emphasized relative to the Address field, by using larger font size, or different color or different boldness The "Education Checks" procedure(s) perform the following checks:
1. If checking a section, verify that the section does not include listings of both "High School" and higher educations such as "College" or "University"
2. If checking a sub-section, and the description field of the sub-section includes reference to grade-point-average (GPA), then verify that the numeric value of the GPA is at least 3.0. This is done by looking for character strings such as "GPA", "G.P.A", and "Grade Point Average"
3. If checking a sub-section, verify that the following fields are not empty: School Name, School Location, Degree, and Description.

The "Experience/Employment Checks" verify that the following fields are not empty: Employer, Location, Job Title, and Description.

If checking a resume document, and the "Dates Checks" procedure is called to check a Section (not a sub-section), this procedure will:
1. Parse the date fields of all sub-sections that contain dates, into an array containing one entry for each sub-section. Each entry may include one or two dates. The date parsing logic allows dates to be partial, that is, only year, or only month and year. Special flags are used to indicate which parts of the date are valid and what format this date takes. These flags are later used to compare partially-specified dates to each other 2. In an Experience or Employment section, for each sub-section with both Start and End date, verify that the dates are valid, and that Start date is not later than End date, and that the Start date does not equal "Present". If only one date is specified, and it is valid, verify that it specifies a year (e.g. "1998"), and is not specific as to the month and/or day.
3. In an Education section, verify that a graduation date is included and is valid. If a date is valid, and that date is more than 20 years ago, alert the user that the education date may reflect their age and there may be a consideration to remove that date.
4. In an Experience section, look for date overlaps between sub-sections
5. Verify that sub-sections are ordered in reverse-chronological order
6. If this is an Experience or Employment section, look for gaps between sub-section dates The "Letter 'To' Section Checks" checks the part of the letter that describes who the letter is sent to. If checking a sub-section, perform the following checks:
1. Verify that the date field contains a valid date
2. Verify that these fields are not empty: Name, Position/Title, Company Name, Street Address
3. Verify that the address contains a valid zip code The "References Checks" procedures ensure that applicants do not include a list of names as their references, but instead defer the subject of references to be provided upon request. If the procedure is called to check a sub-section of a References section, the program will perform the following checks:
1. Look for an empty "references" section
2. Look for a section that has more than 6 words, or that does not contain the word "Request." Hence "Available upon request" is considered an acceptable form, while "John Smith, 555 Richmond Blvd., San Diego" will trigger an error message.

The "Document Check" Procedures implements the following:
1. Check values of page margins and indent ("indent" is the width of an imaginary left column containing employment dates in certain resume styles), to ensure that respective margins match each other and all values fall within acceptable range.
2. Check resume headings for improperly ordered or missing headings. For example, check that the Name section is present and that the Objective section is after, and not before, the Name section. Check that both Experience and Education sections are present, and that References section, if included, is the last section.
3. Check consistency of capitalization in headings
4. Check consistency of character attributes (e.g. bold, italic) in headings
5. Summarize statistics–action verbs found, quantitative expressions fount, etc.
6. Produce a legal disclaimer and add it to the report The last wizard step displays a report to the user. The report can also be printed or saved in HTML format. The report includes key statistics, as well as a list of messages of various severity levels. The most severe messages—alerts—are listed first, followed by warnings, followed by the least severe messages—notes (which may report suggestions).

The embodiments described above evaluate job seeking documents using rules specific to job seeking documents. The present invention can be extended to other types of documents by using rules specific to those other types of documents.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A computer implemented method of performing an evaluation specific to job seeking documents, comprising the steps of:

accessing a resume that is stored electronically, said accessing being performed by a computer, said resume includes multiple sections of different types of data;

automatically, by said computer, evaluating said resume using global document rules that are specific for resumes but are not specific to one type of data, said global document rules define one or more error conditions in resumes, said evaluating using global document rules includes applying said global document rules to actual data in said resume and identifying one or more of said error conditions that exist in said actual data in said resume based on said global document rules;

automatically, by said computer, evaluating said resume using multiple sets of section rules that are specific to resumes, each set of section rules defines one or more error conditions in and specific to a subset of one or more sections of said resume, each set of section rules is different from other sets of section rules and is applied to a different sections of said resume, said evaluating using multiple sets of section rules includes applying said multiple sets of section rules to actual data in said resume and identifying one or more of said error conditions that exist in said actual data in said resume based on said multiple sets of section rules, said global document rules define error conditions for multiple sections of said resume; and in response to said evaluating said resume using global document rules and said evaluating said resume using multiple sets of section rules, creating a report about said identified one or more error conditions that exist in said actual data and outputting said report, said creating the report is performed by said computer.

2. A method according to claim 1, wherein:
said evaluating said resume using multiple sets of section rules includes accessing a section of said resume, determining a type of section accessed, and applying the appropriate set of section rules for the determined type of section accessed.

3. A method according to claim 1, wherein:
said resume is in free form format or field section format.

4. A method according to claim 1, wherein:
said evaluating said resume using global document rules includes using said global document rules to identify actual content in said resume that is not incorrect but can be improved;
said evaluating said resume using multiple sets of section rules includes using said multiple sets of section rules to identify actual content in said resume that is not incorrect but can be improved; and said report that includes advice identifying how to improve said content that is not incorrect but can be improved.

5. A method according to claim 1, wherein:
said set of global document rules and said section rules check data other than date data and spelling.

6. A method according to claim 1, wherein said evaluating said resume using multiple sets of section rules includes:
automatically, by said computer, determining whether said resume includes a reference to a destination accessible via a computer network; and
if said resume includes a reference to a destination accessible via the computer network, then automatically accessing said destination via the computer network to verify that said destination exists.

7. A method according to claim 1, further comprising the steps of:
receiving said resume in a free form format; and
converting said resume to a format that includes fields, said step of converting includes accessing paragraphs, parsing said paragraphs into specific fields for said section and repeating said accessing and parsing for additional sections of said first job seeking document, said section corresponds to one set of said section rules.

8. A method according to claim 1, wherein:
said applying said global document rules to actual data in said resume includes checking attributes that apply to the entire resume.

9. A method according to claim 1, wherein:
said identifying one or more of said error conditions that exist in said actual data in said resume based on said global document rules includes identifying one or more of uneven margins, margins outside of range, page less than one third full, greater than two pages, inconsistent indentation, inconsistent fonts, inconsistent case, missing sections, duplicate sections and improperly ordered sections.

10. A method according to claim 1, wherein:
said evaluating said resume using global document rules includes determining how many action verbs are included in said resume, said report indicates how many action verbs are included in said resume.

11. A method according to claim 1, wherein:
said evaluating said resume using global document rules includes determining how many quantitative expressions are included in said resume, said report indicates how many quantitative expressions are included in said resume.

12. A method according to claim 1, wherein:
said evaluating said resume using global document rules includes determining whether said resume includes more than a predetermined number of pages and said report indicates whether said resume includes more than said predetermined number of pages.

13. A method according to claim 1, further comprising:
determining whether salary information is included in said resume, said report indicates whether salary information is included in said resume.

14. A method according to claim 1, further comprising:
determining whether unwanted personal information is included in said resume, said report indicates whether unwanted personal information is included in said resume.

15. A method of performing an evaluation specific to job seeking documents, comprising the steps of:
accessing a resume that includes multiple sections of different types of data;
automatically, by said computer, evaluating said resume using multiple sets of section rules that are specific to resumes, each set of section rules defines one or more error conditions in and specific to a corresponding section of said resume, each set of section rules is different from other sets of section rules and is applied to a different section of said resume, said evaluating comprises:
accessing a section of said resume,
determining a type of section accessed,
applying the appropriate set of section rules for the determined type of section accessed to actual data in said resume and identifying one or more of said error conditions that exist in said actual data, and
repeating said accessing a section, determining a type and applying for other sections of the resume, each time using a different set of section rules; and
creating a report about said identified one or more error conditions that exist in said actual data and outputting said report, said creating the report is performed by a computer.

16. A method according to claim 9, wherein:
said evaluating said resume using multiple sets of section rules includes using said multiple sets of section rules to identify actual content in said resume that is not incorrect but can be improved, said report identifies actual content in said resume that is not incorrect but can be improved.

17. A method according to claim 15, wherein: said creating a report includes generating statistics.

18. A method according to claim 15, wherein:
said multiple sets of section rules include a rules that check data other than date data.

19. A method according to claim 15, wherein said applying sets of evaluation rules comprises:
accessing a source outside of said resume to verify whether content of said resume is accurate.

20. A method according to claim 15, further comprising the steps of:
receiving said resume in a free form format; and
converting said resume to a field/section format.

21. A method of performing an evaluation specific to job seeking documents, comprising the steps of:
receiving a resume from a first entity;
automatically, by a computer, evaluating one or more data items in said resume using rules specific to resumes, said step of evaluating includes using said rules to recognize actual content stored in said resume and received from said first entity that is not incorrect but can be improved;
automatically, by said computer, generating a report that identifies said content that is not incorrect but can be improved; and
providing said report to said first entity.

22. A method according to claim 21, wherein:
said step of evaluating includes identifying dates that are sufficiently early in time to allow an inference of age.

23. A method according to claim 21, wherein:
said advice includes recommending that content should be removed.

24. A method according to claim 21, further comprising:
converting said first job seeking document from a free form format to a format that includes fields.

25. A method of performing an evaluation specific to job seeking documents, comprising the steps of:
accessing content of a resume;
evaluating said resume using a set of one or more rules specific to resumes, said set of one or more rules include global document rules that are not specific to one type of data, said global document rules define one or more error conditions in resumes, said evaluating includes applying said global document rules to actual data in said resume and identifying one or more of said error conditions that exist in said actual data in said resume based on said global document rules, said evaluating said resume includes determining how many action verbs are included in said resume; and creating a report about said identified one or more error conditions that exist in said actual data and outputting said report, said report indicates how many action verbs are included in said resume.

26. A method of performing an evaluation specific to job seeking documents, comprising the steps of:

accessing content of a resume;

evaluating said resume using a set of one or more rules specific to resumes, said set of one or more rules include global document rules that are not specific to one type of data, said global document rules define one or more error conditions in resumes, said evaluating includes applying said global document rules to actual data in said resume and identifying one or more of said error conditions that exist in said actual data in said resume based on said global document rules, said evaluating said resume includes determining how many quantitative expressions are included in said resume; and creating a report about said identified one or more error conditions that exist in said actual data and outputting said report, said report indicates how many quantitative expressions are included in said resume.

27. A method of performing an evaluation specific to job seeking documents, comprising the steps of:

accessing content of a resume;

evaluating said resume using a set of one or more rules specific to resumes, said set of one or more rules include global document rules that are not specific to one type of data, said global document rules define one or more error conditions in resumes, said evaluating includes applying said global document rules to actual data in said resume and identifying one or more of said error conditions that exist in said actual data in said resume based on said global document rules, said evaluating said resume includes determining whether said resume includes more than a predetermined number of pages; and creating a report about said identified one or more error conditions that exist in said actual data and outputting said report, and said report indicates whether said resume includes more than said predetermined number of pages.

* * * * *